(12) United States Patent
Kim et al.

(10) Patent No.: US 8,812,942 B2
(45) Date of Patent: Aug. 19, 2014

(54) INTERLEAVING APPARATUSES AND MEMORY CONTROLLERS HAVING THE SAME

(75) Inventors: Jaehong Kim, Seoul (KR); Hee-Seok Eun, Hwaseong-si (KR); Ki-Jun Lee, Seoul (KR); Yong-June Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 646 days.

(21) Appl. No.: 12/944,807

(22) Filed: Nov. 12, 2010

(65) Prior Publication Data

US 2011/0125975 A1       May 26, 2011

(30) Foreign Application Priority Data

Nov. 23, 2009   (KR) .......................... 10-2009-0113102

(51) Int. Cl.
*G06F 11/00*            (2006.01)
(52) U.S. Cl.
USPC ........................................................ 714/801
(58) Field of Classification Search
CPC ... G06F 11/10; G06F 11/1076; H04L 1/0057; H03M 13/116; G11B 20/1833
See application file for complete search history.

(56) References Cited

U.S. PATENT DOCUMENTS

| | | | |
|---|---|---|---|
| 5,392,299 A * | 2/1995 | Rhines et al. .................. | 714/756 |
| 5,537,420 A | 7/1996 | Huang | |
| 5,754,566 A * | 5/1998 | Christopherson et al. .... | 714/773 |
| 5,968,200 A * | 10/1999 | Amrany ......................... | 714/786 |
| 6,205,104 B1 * | 3/2001 | Nagashima et al. ........ | 369/59.14 |
| 7,430,702 B2 | 9/2008 | Taguchi | |
| 2004/0107311 A1 * | 6/2004 | Chen .............................. | 711/113 |
| 2004/0208139 A1 * | 10/2004 | Iwamura ....................... | 370/321 |
| 2005/0063421 A1 * | 3/2005 | Wan et al. ..................... | 370/509 |
| 2007/0168625 A1 * | 7/2007 | Cornwell et al. ............. | 711/157 |
| 2007/0239931 A1 * | 10/2007 | Chen et al. .................... | 711/111 |
| 2008/0069248 A1 * | 3/2008 | Heise et al. ................... | 375/254 |
| 2008/0074973 A1 * | 3/2008 | Nishino ..................... | 369/53.15 |
| 2008/0147968 A1 * | 6/2008 | Lee et al. ...................... | 711/103 |
| 2010/0082917 A1 * | 4/2010 | Yang et al. .................... | 711/157 |
| 2010/0211833 A1 * | 8/2010 | Weingarten ................... | 714/704 |

FOREIGN PATENT DOCUMENTS

| | | |
|---|---|---|
| JP | 07-230674 | 8/1995 |
| KR | 10-2000-015757 | 3/2000 |

* cited by examiner

*Primary Examiner* — Albert Decady
*Assistant Examiner* — Enamul M Kabir
(74) *Attorney, Agent, or Firm* — Harness, Dickey & Pierce, P.L.C.

(57) ABSTRACT

An interleaving apparatus may include a first buffer unit configured to buffer input data in units having a size of a sector to generate sector unit data, an encoding unit configured to encode the sector unit data and generate a plurality of parity codes based on the encoding, a second buffer unit configured to interleave the sector unit data and the parity codes and generate interleaving data based on the interleaving, the second buffer unit including a plurality of output buffers configured to store the interleaving data, and an output unit configured to output the interleaving data.

12 Claims, 16 Drawing Sheets

INTERLEAVING APPARATUSES AND MEMORY CONTROLLERS HAVING THE SAME

CROSS-REFERENCE TO RELATED APPLICATION(S)

This application claims priority under 35 U.S.C. §119 to Korean Patent Application No. 2009-0113102, filed on Nov. 23, 2009, in the Korean Intellectual Property Office (KIPO), the entire contents of which are incorporated herein by reference.

BACKGROUND

1. Technical Field

Example embodiments relate to a semiconductor memory devices, and more particularly to an interleaving apparatus and a memory controller having the same for a flash memory device.

2. Description of the Related Art

A semiconductor memory device may be classified into two types: a volatile memory device in which data is lost when a power is not provided and a non-volatile memory device in which data is kept when a power is not provided. Recently, a NAND flash memory device as the non-volatile memory device is widely used. Typically, a unit of read operations and write operations in the NAND flash memory device is a page, so that data stored in a memory cell array cannot be randomly accessed. Thus, the NAND flash memory device may employ interleaving functions to prevent input/output errors due to a limited correction ability of error correction codes. However, conventional interleaving apparatuses have a complicated structure, so that the conventional interleaving apparatuses may not be implemented in a small size. In addition, the conventional interleaving apparatuses may not efficiently perform interleaving operations in various manners.

SUMMARY

Example embodiments provide an interleaving apparatus having a simple structure capable of efficiently performing interleaving operations in various manners.

Example embodiments provide a memory controller having the interleaving apparatus.

According to some example embodiments, an interleaving apparatus may include a first buffer unit configured to buffer input data in units having a size of a sector to generate sector unit data, an encoding unit configured to encode the sector unit data and generate a plurality of parity codes based on the encoding, a second buffer unit configured to interleave the sector unit data and the parity codes and generate interleaving data based on the interleaving, the second buffer unit including a plurality of output buffers configured to store the interleaving data, and an output unit configured to output the interleaving data.

In some embodiments, the first buffer unit may include an input buffer having a size of the sector.

In some embodiments, sizes of the plurality of output buffers may be between the sector and a page.

In some embodiments, the input buffer and the plurality of output buffers may be a static random access memory (SRAM) device, or a dynamic random access memory (DRAM) device.

In some embodiments, the second buffer unit is configured to divide the sector unit data and the parity codes into a plurality of data groups, and interleave the plurality of data groups.

In some embodiments, the second buffer unit is configured to divide the sector unit data and the parity codes into a first data group and a second data group, divide the plurality of output buffers into a first buffer group and a second buffer group, interleave the first data group into the first buffer group, and interleave the second data group into the second buffer group.

In some embodiments, the second buffer unit is configured to divide the sector unit data and the parity codes into a plurality of data groups, interleave at least one of the plurality of data groups and may sequentially store at least another of the plurality of data groups.

In some embodiments, the second buffer unit is configured to divide the sector unit data and the parity codes into a first data group and a second data group, divide the plurality of output buffers into a first buffer group and a second buffer group, interleave the first data group into the first buffer group, and store the second data group in the second buffer group.

In some embodiments, the second buffer unit is configured to divide the sector unit data and the parity codes into a plurality of data groups, interleave at least one of the plurality of data groups into the output buffers, and directly output at least another of the plurality of data groups to at least one memory device.

In some embodiments, the second buffer unit is configured to divide the sector unit data and the parity codes into a first data group and a second data group, interleave the first data group into the output buffers, and directly output the second data group to the at least one memory device.

In some embodiments, the output unit is configured to encode the interleaving data and output encoded interleaving data to the at least one memory device.

According to some example embodiments, a memory controller may include a write unit configured to receive write commands and write addresses, buffer input data output from a host device in units having a size of a sector to generate sector unit data, interleave the sector unit data, generate interleaving data based on the interleaving, and to write the interleaving data into at least one memory device in response to the write commands and write addresses, and a read unit configured to receive read commands and read addresses, read read data from the at least one memory device in response to the read commands and read addresses, generate output data based on the read data, and output the output data to the host device.

In some embodiments, the memory controller may be in the host device or the at least one memory device.

In some embodiments, the memory controller may further include a central processing unit configured to control the write unit and the read unit, a host interface configured to receive the input data from the host device and output the output data to the host device, and a memory interface configured to output the interleaving data and receive the read data from the at least one memory device.

In some embodiments, the write unit may include a first buffer unit configured to buffer the input data and generate the sector unit data based on the input data, an encoding unit configured to encode the sector unit data and generate a plurality of parity codes based on the encoding, a second buffer unit configured to interleave the sector unit data and the parity codes and generate the interleaving data, the second buffer including a plurality of output buffers configured to store the interleaving data, and a memory output unit configured to output the interleaving data to the at least one memory device.

In some embodiments, the memory output unit is configured to encode the interleaving data and output the encoded interleaving data to the at least one memory device.

In some embodiments, the read unit may include a third buffer unit configured to store the read data, a decoding unit configured to decode the read data and generate the output data based on the decoding, and a host output unit configured to output the output data to the host device.

In some embodiments, the second buffer unit may divide the sector unit data and the parity codes into a plurality of data groups and interleave the plurality of data groups In some embodiments, the second buffer unit may divide the sector unit data and the parity codes into a plurality of data groups, interleave at least one of the plurality of data groups and sequentially store at least another of the plurality of data groups.

In some embodiments, the second buffer unit may divide the sector unit data and the parity codes into a plurality of data groups, interleave at least one of the plurality of data groups into the output buffers, and directly output at least another of the plurality of data groups to the at least one memory device.

At least another example embodiment provides a system including a memory controller having, a write unit configured to receive write commands and write addresses, buffer input data output from a host device in units having a size of a sector to generate sector unit data, interleave the sector unit data, generate interleaving data based on the interleaving, and to write the interleaving data into at least one memory device in response to the write commands and write addresses, and a read unit configured to receive read commands and read addresses, read read data from the at least one memory device in response to the read commands and read addresses, generate output data based on the read data, and output the output data to the host device, the host device configured to output the input data and receive the output data, and the at least one memory device configured to receive the interleaving data.

Accordingly, an interleaving apparatus may have a simple structure by reducing the number of buffers (i.e., input buffer and output buffers) and sizes of the buffers (i.e., input buffer and output buffers), may perform different interleaving operations for each of data groups (i.e., groups of sector unit data and parity codes), and may selectively perform interleaving operations for data groups (i.e., groups of sector unit data and parity codes). In addition, a memory controller having the interleaving apparatus may efficiently perform write operations for a semiconductor memory device (e.g., a NAND flash memory device).

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF EXAMPLE EMBODIMENTS

Figure 1:
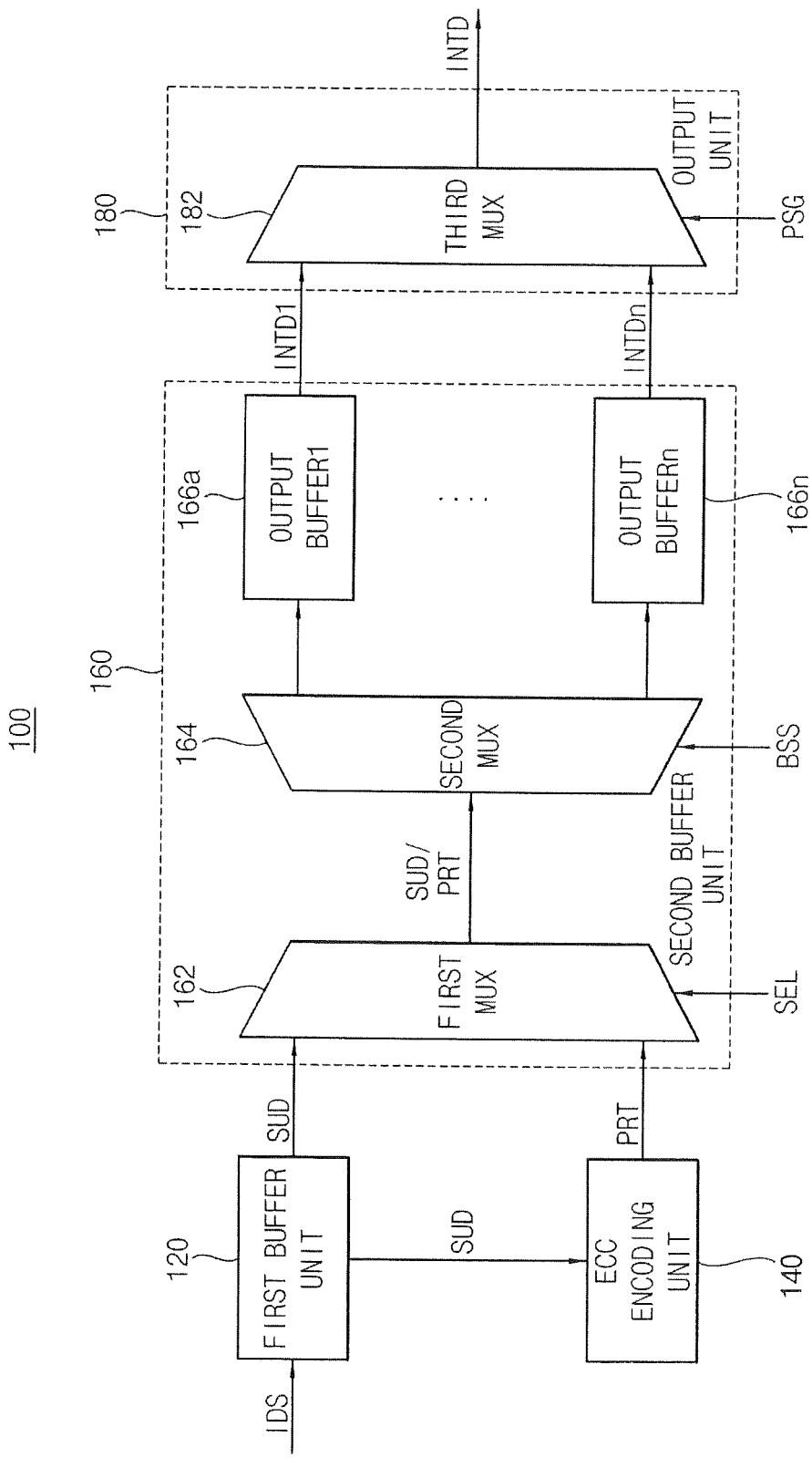
FIG. 1 is a block diagram illustrating an interleaving apparatus according to some example embodiments.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an interleaving apparatus according to some example embodiments.

Referring to FIG. 1, an interleaving apparatus 100 may include a first buffer unit 120, an encoding unit 140, a second buffer unit 160, and an output unit 180.

When input data IDS is received from outside, the first buffer unit 120 may buffer the input data IDS in a sector unit to sequentially generate sector unit data SUD, and may sequentially output the sector unit data SUD to the encoding unit 140 and the second buffer unit 160. The input data IDS (i.e., sequence-type data) may be input from a host device to the interleaving apparatus 100 via a host interface. For example, the host device may be a personal computer, and the host interface may include a standard protocol such as an universal serial bus (USB), a multimedia card (MMC), a peripheral component interconnection (PCI), a peripheral component interconnection express (PCI-EXPRESS), an advanced technology attachment (ATA), a serial advanced technology attachment (SATA), a parallel advanced technology attachment (PATA), a small computer system interface (SCSI), a enhanced small disk interface (ESDI), a serial attached small computer system interface (SAS), a integrated drive electronics (IDE), etc. If the host interface includes the SAS, data transference may be relatively fast. In addition, a SAS wide link that performs connections among devices using a plurality of buses may be used. In one example embodiment, the first buffer unit 100 may include an input buffer having a sector size (i.e., a size corresponding to one sector). The input buffer may be implemented by a static random access memory (SRAM) device, or a dynamic random access memory (DRAM) device.

The encoding unit 140 may perform error check and correction (ECC) operations for the sector unit data SUD that is sequentially output from the first buffer unit 120, and sequentially generate parity codes PRT. The parity codes PRT that are sequentially generated by the encoding unit 140 may match with the sector unit data SUD that are sequentially output from the first buffer unit 120, respectively. For example, Hamming code or Bose Chaudhuri Hocquenghem (BCH) code may be used as an ECC encoding algorithm for the encoding unit 140. According to the hamming code, an error correction of one bit may be performed for the sector unit data SUD. According to BCH code, an error correction of several bits may be performed for the sector unit data SUD. However, the ECC encoding algorithm for the encoding unit 140 is not limited thereto.

The second buffer unit 160 may receive the sector unit data SUD from the first buffer unit 120, and may receive the parity codes PRT from the encoding unit 140. The second buffer unit 160 may store the sector unit data SUD and the parity codes PRT into a plurality of output buffers 166a through 166n by performing interleaving operations for the sector unit data SUD and the parity codes PRT. In one example embodiment, the second buffer unit 160 may include a first multiplexer 162, the output buffers 166a through 166n, and a second multiplexer 164. The first multiplexer 162 may selectively output the sector unit data SUD and the parity codes PRT in response to a data selection signal SEL. The second multiplexer 164 may alternatively select the output buffers 166a through 166n in response to a buffer selection signal BSS to perform interleaving operations for the sector unit data SUD and the parity codes PRT. The output buffers 166a through 166n may store the sector unit data SUD and the parity codes PRT output from the second multiplexer 164. The data selection signal SEL and the buffer selection signal BSS may be signals provided from a central processing unit (CPU) in a memory controller and the like.

The output buffers 166a through 166n in the second buffer unit 160 may be implemented by a SRAM device, or a DRAM device. Sizes of the output buffers 166a through 166n may be variously determined based on required conditions for interleaving operations. Preferably, sizes of the output buffers 166a through 166n may be between a sector size and a page size (i.e., more than a sector size, and less than a page size). For example, assuming that sizes of the output buffers 166a through 166n are the same as a page size (i.e., a size corresponding to one page), when interleaving data INTD1 through INTDn having a page size are stored in the output buffers 266a through 266n, the interleaving data INTD1 through INTDn may be output from the output buffers 166a through 166n to a memory cell array of at least one memory device via page buffers based on write commands.

The second buffer unit 160 may perform interleaving operations in various manners. In one example embodiment, the second buffer unit 160 may perform different interleaving operations for each of data groups (i.e., groups of the sector unit data SUD and the parity codes PRT). For example, the second buffer unit 160 may perform different interleaving operations for each of data groups by controlling the data selection signal SEL and the buffer selection signal BSS. In one example embodiment, the second buffer unit 160 may selectively perform interleaving operations for data groups (i.e., groups of the sector unit data SUD and the parity codes PRT). That is, the second buffer unit 160 may perform interleaving operations for selected data groups, and may not perform interleaving operations for non-selected data groups. For example, the second buffer unit 160 may selectively perform interleaving operations for data groups by controlling the data selection signal SEL and the buffer selection signal BSS. Here, an interleaving depth may correspond to the number of the output buffers 166a through 166n.

In detail, the second buffer unit 160 may divide the sector unit data SUD and the parity codes PRT into a plurality of data groups, and may divide the output buffers 166a through 166n into a plurality of buffer groups. In one example embodiment, the second buffer unit 160 may perform interleaving operations for each of data groups, and may store interleaving data into each of buffer groups. For example, the second buffer unit 160 may divide the sector unit data SUD and the parity codes PRT into two data groups (i.e., a first data group and a second data group), and may divide the output buffers 166a through 166n into two buffer groups (i.e., a first buffer group and a second buffer group). Then, the second buffer unit 160 may perform interleaving operations for the first data group to store interleaving data of the first data group into the first buffer group, and may perform interleaving operations for the second data group to store interleaving data of the second data group into the second buffer group. In one example embodiment, the second buffer unit 160 may perform interleaving operations for only selected data groups, and may store interleaving data and non-interleaving data into the output buffers 166a through 166n. For example, the second buffer unit 160 may divide the sector unit data SUD and the parity codes PRT into two data groups (i.e., a first data group and a second data group), and may divide the output buffers 166a through 166n into two buffer groups (i.e., a first buffer group and a second buffer group). Then, the second buffer unit 160 may perform interleaving operations for the first data group to store interleaving data of the first data group into the first buffer group, and may not perform interleaving operations for the second data group to store non-interleaving data of the second data group into the second buffer group.

The output unit 180 may output interleaving data INTD1 through INTDn from the output buffers 166a through 166n to a memory cell array of at least one memory device via page buffers. In one example embodiment, the output unit 180 may include a third multiplexer 182. The third multiplexer 182 selects the output buffers 166a through 166n in response to a write selection signal PSG, so that interleaving data INTD1 through INTDn stored in the output buffers 166a through 166n may be output to a memory cell array of at least one memory device via page buffers. In addition, at least one memory device may be a NAND flash memory device of a signal level cell (SLC) type, or a NAND flash memory device of a multi level cell (MLC) type. At least one memory device may be coupled to the interleaving apparatus 100 in a single channel manner, or in a multi channel manner.

As described above, the interleaving apparatus 100 may include the first buffer unit 120, the encoding unit 140, the second buffer unit 160, and the output unit 180. As a result, the interleaving apparatus 100 may perform different interleaving operations for each of data groups, and may selectively perform interleaving operations for data groups. In addition, since the interleaving apparatus 100 includes the input buffer having a sector size in the first buffer unit 120 and the output buffers 166a through 166n having a size between a sector size and a page size in the second buffer unit 160, the interleaving apparatus 100 may be implemented in a small size (i.e., sizes of buffers and the number of buffers may be reduced). Thus, the interleaving apparatus 100 may have a simple structure, and may efficiently perform interleaving operations in various manners.

Figure 2:
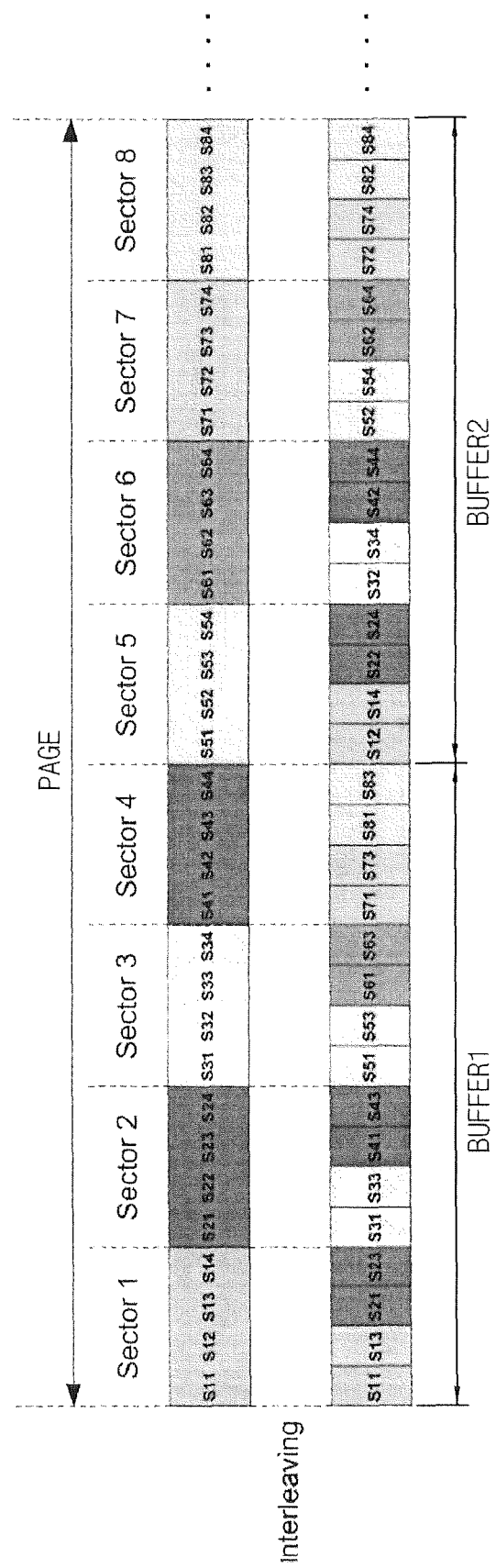
FIG. 2 is a diagram illustrating a first example that interleaving operations are performed on a NAND flash memory device of a signal level cell (SLC) type by an interleaving apparatus of FIG. 1.

FIG. 2 is a diagram illustrating a first example that interleaving operations are performed on a NAND flash memory device of a signal level cell (SLC) type by an interleaving apparatus of FIG. 1.

Referring to FIG. 2, the interleaving apparatus 100 may include two output buffers BUFFER1 and BUFFER2 in the second buffer unit 160 (n=2). Each of the two output buffers BUFFER1 and BUFFER2 may have a size corresponding to four sectors. In FIG. 2, an interleaving depth may be 2 because interleaving operations are performed on two output buffers BUFFER1 and BUFFER2.

As one bit data is stored in one memory cell of the NAND flash memory device of the SLC type, one word-line may correspond to one page. As shown in FIG. 2, for example, one page PAGE may include eight sectors SECTOR1 through SECTOR8. In the interleaving apparatus 100, the first buffer unit 120 may buffer the input data IDS in a sector unit to sequentially generate the sector unit data SUD. The input data IDS may be received from a host device via a host interface. In addition, the encoding unit 140 may sequentially generate the parity codes PRT matching with the sector unit data SUD. Further, the second buffer unit 160 may perform interleaving operations for the sector unit data SUD and the parity codes PRT.

In detail, a first sub sector S11 of a first sector SECTOR1 is stored into the first output buffer BUFFER1, a second sub sector S12 of the first sector SECTOR1 is stored into the second output buffer BUFFER2, a third sub sector S13 of the first sector SECTOR1 is stored into the first output buffer BUFFER1, and a fourth sub sector S14 of the first sector SECTOR1 is stored into the second output buffer BUFFER2. Then, a first sub sector S21 of a second sector SECTOR2 is stored into the first output buffer BUFFER1, a second sub sector S22 of the second sector SECTOR2 is stored into the second output buffer BUFFER2, a third sub sector S23 of the second sector SECTOR2 is stored into the first output buffer BUFFER1, and a fourth sub sector S24 of the second sector SECTOR2 is stored into the second output buffer BUFFER2. Similarly, interleaving operations are sequentially performed for third through eighth sectors SECTOR3 through SECTOR 8. As a result, first interleaving data S11, S13, S21, S23, S31, S33, S41, S43, S51, S53, S61, S63, S71, S73, S81, and S83 may be stored into the first output buffer BUFFER1, and second interleaving data S12, S14, S22, S24, S32, S34, S42, S44, S52, S54, S62, S64, S72, S74, S82, and S84 may be stored into the second output buffer BUFFER2.

Figure 3:
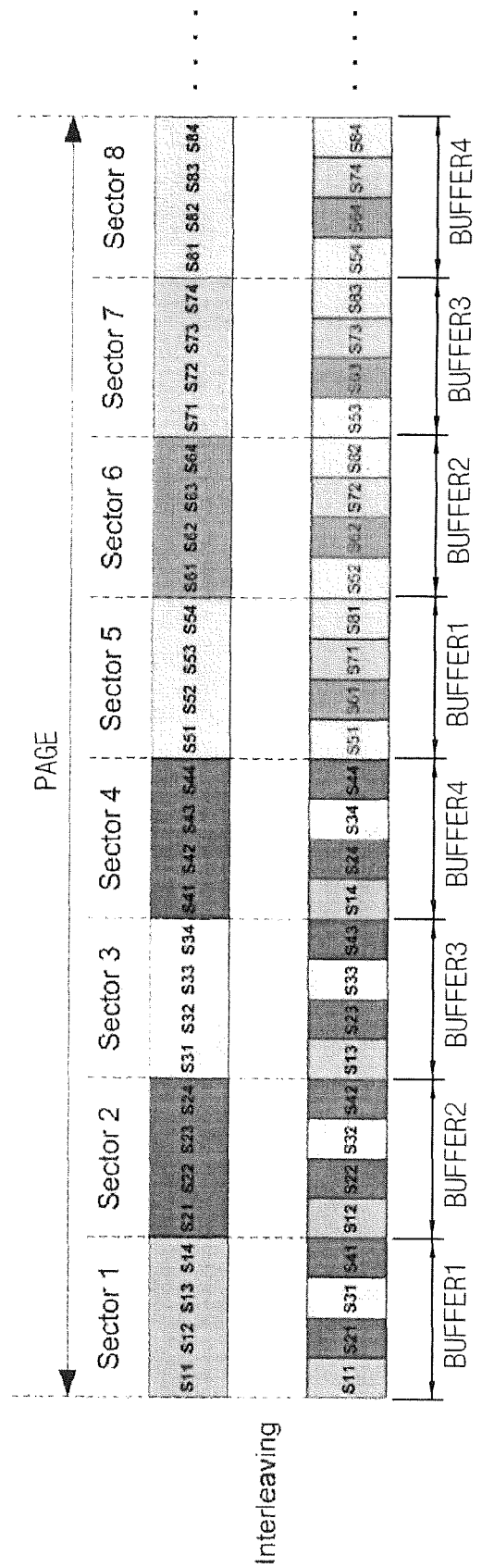
FIG. 3 is a diagram illustrating a second example that interleaving operations are performed on a NAND flash memory device of a signal level cell (SLC) type by an interleaving apparatus of FIG. 1.

FIG. 3 is a diagram illustrating a second example that interleaving operations are performed on a NAND flash memory device of a signal level cell (SLC) type by an interleaving apparatus of FIG. 1.

Referring to FIG. 3, the interleaving apparatus 100 may include four output buffers BUFFER1 through BUFFER4 in the second buffer unit 160 (n=4). Each of four output buffers BUFFER1 through BUFFER4 may have a size corresponding to two sectors. In FIG. 3, an interleaving depth may be 4 because interleaving operations are performed on four output buffers BUFFER1 through BUFFER4. As shown in FIG. 3, for example, one page PAGE may include eight sectors SECTOR1 through SECTOR8.

In detail, a first sub sector S11 of a first sector SECTOR1 is stored into the first output buffer BUFFER1, a second sub sector S12 of the first sector SECTOR1 is stored into the second output buffer BUFFER2, a third sub sector S13 of the first sector SECTOR1 is stored into the third output buffer BUFFER3, and a fourth sub sector S14 of the first sector SECTOR1 is stored into the fourth output buffer BUFFER4. Then, a first sub sector S21 of a second sector SECTOR2 is stored into the first output buffer BUFFER1, a second sub sector S22 of the second sector SECTOR2 is stored into the second output buffer BUFFER2, a third sub sector S23 of the second sector SECTOR2 is stored into the third output buffer BUFFER3, and a fourth sub sector S24 of the second sector SECTOR2 is stored into the fourth output buffer BUFFER4. Similarly, interleaving operations are sequentially performed for third through eighth sectors SECTOR3 through SECTOR8. As a result, first interleaving data S11, S21, S31, S41, S51, S61, S71, and S81 may be stored into the first output buffer BUFFER1, second interleaving data S12, S22, S32, S42, S52, S62, S72, and S82 may be stored into the second output buffer BUFFER2, third interleaving data S13, S23, S33, S43, S53, S63, S73, and S83 may be stored into the third output buffer BUFFER3, and fourth interleaving data S14, S24, S34, S44, S54, S64, S74, and S84 may be stored into the fourth output buffer BUFFER4.

Figure 4:
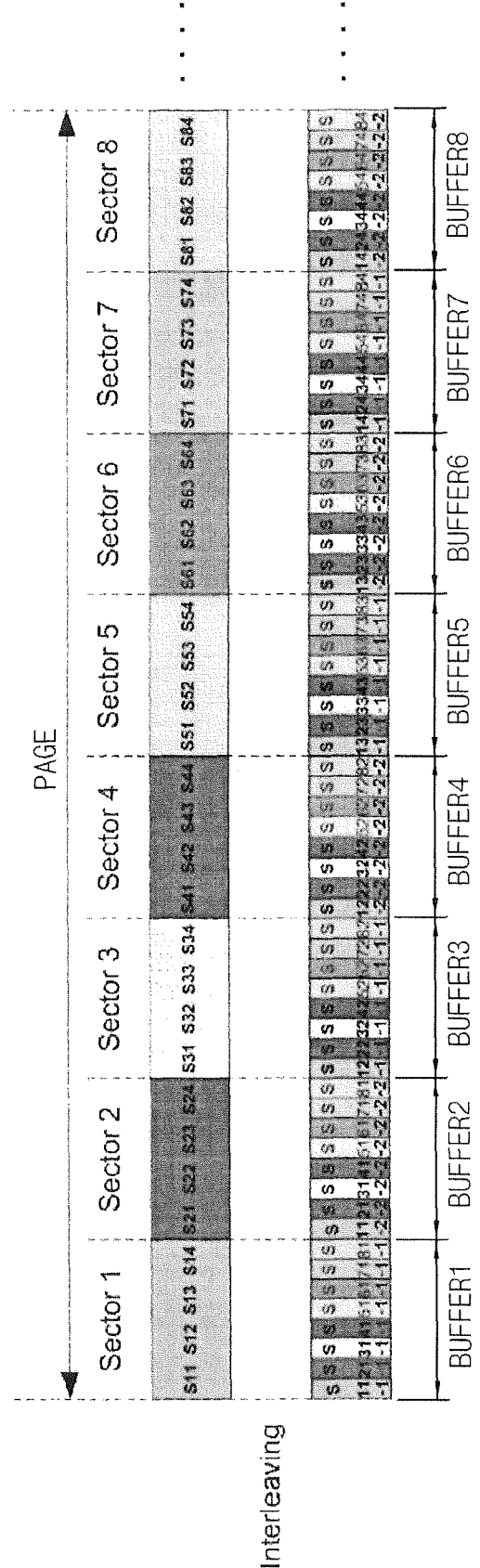
FIG. 4 is a diagram illustrating a third example that interleaving operations are performed on a NAND flash memory device of a signal level cell (SLC) type by an interleaving apparatus of FIG. 1.

FIG. 4 is a diagram illustrating a third example that interleaving operations are performed on a NAND flash memory device of a signal level cell (SLC) type by an interleaving apparatus of FIG. 1.

Referring to FIG. 4, the interleaving apparatus 100 may include eight output buffers BUFFER1 through BUFFER8 in the second buffer unit 160 (n=8). Each of the eight output buffers BUFFER1 through BUFFER8 may have a size corresponding to one sector. In FIG. 4, an interleaving depth may be 8 because interleaving operations are performed on eight output buffers BUFFER1 through BUFFER8. As shown in FIG. 4, for example, one page PAGE may include eight sectors SECTOR1 through SECTOR8.

In detail, a part of a first sub sector S11 of a first sector SECTOR1 is stored into the first output buffer BUFFER1, another part of the first sub sector Si 1 of the first sector SECTOR1 is stored into the second output buffer BUFFER2, a part of a second sub sector S12 of the first sector SECTOR1 is stored into the third output buffer BUFFER3, and another part of the second sub sector S12 of the first sector SECTOR1 is stored into the fourth output buffer BUFFER4. In addition, a part of a third sub sector S13 of the first sector SECTOR1 is stored into the fifth output buffer BUFFER5, another part of the third sub sector S13 of the first sector SECTOR1 is stored into the sixth output buffer BUFFER6, a part of a fourth sub sector S14 of the first sector SECTOR1 is stored into the seventh output buffer BUFFER7, and another part of the fourth sub sector S14 of the first sector SECTOR1 is stored into the eighth output buffer BUFFER8. Similarly, interleaving operations are sequentially performed for a second through eighth sectors SECTOR2 through SECTOR 8.

As a result, first interleaving data S11_1, S21_1, S31_1, S41_1, S51_1, S61_1, S71_1, and S81_1 may be stored into the first output buffer BUFFER1, second interleaving data S11_2, S21_2, S31_2, S41_2, S51_2, S61_2, S71_2, and S81_2 may be stored into the second output buffer BUFFER2, third interleaving data S12_1, S22_1, S32_1, S42_1, S52_1, S62_1, S72_1, and S82_1 may be stored into the third output buffer BUFFER3, and fourth interleaving data S12_2, S22_2, S32_2, S42_2, S52_2, S62_2, S72_2, and S82_2 may be stored into the fourth output buffer BUFFER4. In addition, fifth interleaving data S13_1, S23_1, S33_1, S43_1, S53_1, S63_1, S73_1, and S83_1 may be stored into the fifth output buffer BUFFER5, sixth interleaving data S13_2, S23_2, S33_2, S43_2, S53_2, S63_2, S73_2, and S83_2 may be stored into the sixth output buffer BUFFER6, seventh interleaving data S14_1, S24_1, S34_1, S44_1, S54_1, S64_1, S74_1, and S84_1 may be stored into the seventh output buffer BUFFER7, and eighth interleaving data S14_2, S24_2, S34_2, S44_2, S54_2, S64_2, S74_2, and S84_2 may be stored into the eighth output buffer BUFFER8.

Figure 5:
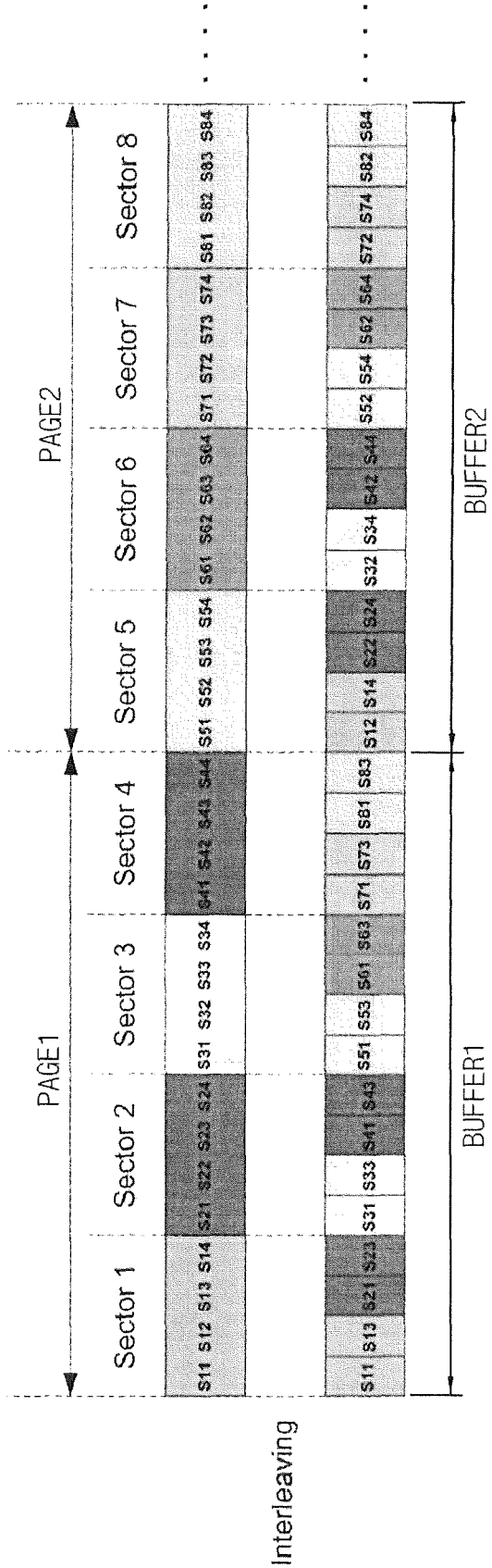
FIG. 5 is a diagram illustrating a first example that interleaving operations are performed on a NAND flash memory device of a multi level cell (MLC) type by an interleaving apparatus of FIG. 1.

FIG. 5 is a diagram illustrating a first example that interleaving operations are performed on a NAND flash memory device of a multi level cell (MLC) type by an interleaving apparatus of FIG. 1.

Referring to FIG. 5, the interleaving apparatus 100 may include two output buffers BUFFER1 and BUFFER2 in the second buffer unit 160 (n=2). Each of two output buffers BUFFER1 and BUFFER2 may have a size corresponding to four sectors. In FIG. 5, an interleaving depth may be 2 because interleaving operations are performed on two output buffers BUFFER1 and BUFFER2.

As several bits (e.g., 2 bits) data are stored in one memory cell of the NAND flash memory device of the MLC type, one word-line may correspond to several pages (e.g., two pages PAGE1 and PAGE2). As shown in FIG. 5, for example, a first page PAGE1 may include four sectors SECTOR1 through SECTOR4, and a second page PAGE2 may include four sectors SECTOR5 through SECTOR8. In the interleaving apparatus 100, the first buffer unit 120 may buffer the input data IDS in a sector unit to sequentially generate the sector unit data SUD. The input data IDS may be received from a host device via a host interface. In addition, the encoding unit 140 may sequentially generate the parity codes PRT matching with the sector unit data SUD. Further, the second buffer unit 160 may perform interleaving operations for the sector unit data SUD and the parity codes PRT.

In detail, a first sub sector Si 1 of a first sector SECTOR1 is stored into the first output buffer BUFFER1, a second sub sector S12 of the first sector SECTOR1 is stored into the second output buffer BUFFER2, a third sub sector S13 of the first sector SECTOR1 is stored into the first output buffer BUFFER1, and a fourth sub sector S14 of the first sector SECTOR1 is stored into the second output buffer BUFFER2. Then, a first sub sector S21 of a second sector SECTOR2 is stored into the first output buffer BUFFER1, a second sub sector S22 of the second sector SECTOR2 is stored into the second output buffer BUFFER2, a third sub sector S23 of the second sector SECTOR2 is stored into the first output buffer BUFFER1, and a fourth sub sector S24 of the second sector SECTOR2 is stored into the second output buffer BUFFER2. Similarly, interleaving operations are sequentially performed on a third through eighth sectors SECTOR3 through SECTOR 8. As a result, first interleaving data S11, S13, S21, S23, S31, S33, S41, S43, S51, S53, S61, S63, S71, S73, S81, and S83 may be stored into the first output buffer BUFFER1, and second interleaving data S12, S14, S22, S24, S32, S34, S42, S44, S52, S54, S62, S64, S72, S74, S82, and S84 may be stored into the second output buffer BUFFER2.

Figure 6:
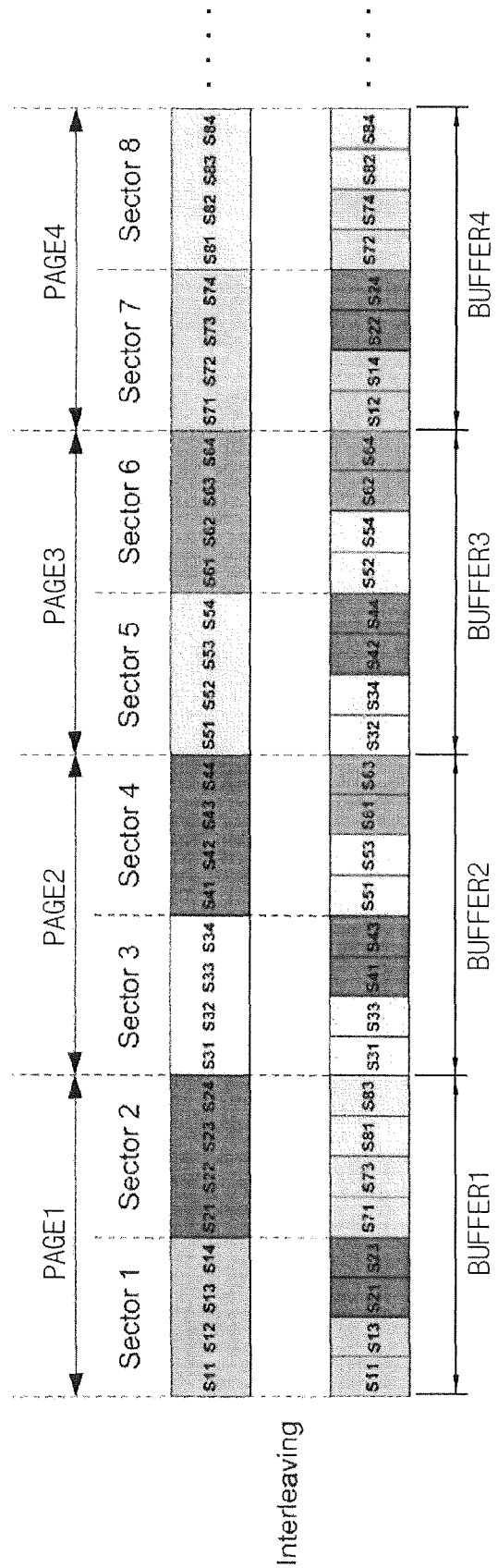
FIG. 6 is a diagram illustrating a second example that interleaving operations are performed on a NAND flash memory device of a multi level cell (MLC) type by an interleaving apparatus of FIG. 1.

FIG. 6 is a diagram illustrating a second example that interleaving operations are performed on a NAND flash memory device of a multi level cell (MLC) type by an interleaving apparatus of FIG. 1.

Referring to FIG. 6, the interleaving apparatus 100 may include four output buffers BUFFER1 through BUFFER4 in the second buffer unit 160 (n=4). Each of four output buffers BUFFER1 through BUFFER4 may have a size corresponding to two sectors. In FIG. 6, four pages PAGE1' through PAGE4 may be divided into two data groups. Here, an interleaving depth may be 2 (i.e., not 4) because interleaving operations are performed for each of two data groups on each of two buffer groups (e.g., for a first data group including a first page PAGE1' and a fourth page PAGE4 on a first buffer group including a first output buffer BUFFER1 and a fourth output buffer BUFFER4, and for a second data group including a second page PAGE2' and a third page PAGE3 on a second buffer group including a second output buffer BUFFER2 and a third output buffer BUFFER3).

As several bits (e.g., 4 bits) data is stored in one memory cell of the NAND flash memory device of the MLC type, one word-line may correspond to four pages PAGE1' through PAGE4. As shown in FIG. 6, for example, a first page PAGE1' may include two sectors SECTOR1 and SECTOR2, a second page PAGE2' may include two sectors SECTOR3 and SECTOR4, a third page PAGE3 may include two sectors SECTOR5 and SECTOR6, and a fourth page PAGE4 may include two sectors SECTOR7 and SECTOR8. As described above, interleaving operations are not performed for all four pages PAGE 1' through PAGE4 on all four output buffers BUFFER1 through BUFFER4. That is, interleaving operations are performed for the first page PAGE1' and the fourth page PAGE4 (i.e., the first data group) on the first output buffer BUFFER1 and the fourth output buffer BUFFER4 (i.e., the first buffer group), and interleaving operations are performed for the second page PAGE2' and the third page PAGE3 (i.e., the second data group) on the second output buffer BUFFER2 and the third output buffer BUFFER3 (i.e., the second buffer group).

In detail, a first sub sector S11 of a first sector SECTOR1 is stored into the first output buffer BUFFER1, a second sub sector S12 of the first sector SECTOR1 is stored into the fourth output buffer BUFFER4, a third sub sector S13 of the first sector SECTOR1 is stored into the first output buffer BUFFER1, and a fourth sub sector S14 of the first sector SECTOR1 is stored into the fourth output buffer BUFFER4. In addition, a first sub sector S21 of a second sector SECTOR2 is stored into the first output buffer BUFFER1, a second sub sector S22 of the second sector SECTOR2 is stored into the fourth output buffer BUFFER4, a third sub sector S23 of the second sector SECTOR2 is stored into the first output buffer BUFFER1, and a fourth sub sector S24 of the second sector SECTOR2 is stored into the fourth output buffer BUFFER4.

Then, a first sub sector S31 of a third sector SECTOR3 is stored into the second output buffer BUFFER2, a second sub sector S32 of the third sector SECTOR3 is stored into the third output buffer BUFFER3, a third sub sector S33 of the third sector SECTOR3 is stored into the second output buffer BUFFER2, and a fourth sub sector S34 of the third sector SECTOR3 is stored into the third output buffer BUFFER3. In addition, a first sub sector S41 of a fourth sector SECTOR4 is stored into the second output buffer BUFFER2, a second sub sector S42 of the fourth sector SECTOR4 is stored into the third output buffer BUFFER3, a third sub sector S43 of the fourth sector SECTOR4 is stored into the third output buffer BUFFER3, and a fourth sub sector S44 of the fourth sector SECTOR4 is stored into the third output buffer BUFFER3.

Similarly, interleaving operations are performed for a fifth and sixth sectors SECTOR5 and SECTOR6 on the second and third output buffers BUFFER2 and BUFFER3. Then, interleaving operations are performed for a seventh and eighth sectors SECTOR7 and SECTOR8 on the first and fourth output buffers BUFFER1 and BUFFER4. As a result, first interleaving data S11, S13, S21, S23, S71, S73, S81, and S83 may be stored into the first output buffer BUFFER1, second interleaving data S31, S33, S41, S43, S51, S53, S61, and S63 may be stored into the second output buffer BUFFER2, third interleaving data S32, S34, S42, S44, S52, S54, S62, and S64 may be stored into the third output buffer BUFFER3, and fourth interleaving data S12, S14, S22, S24, S72, S74, S82, and S84 may be stored into the fourth output buffer BUFFER4.

Figure 7:
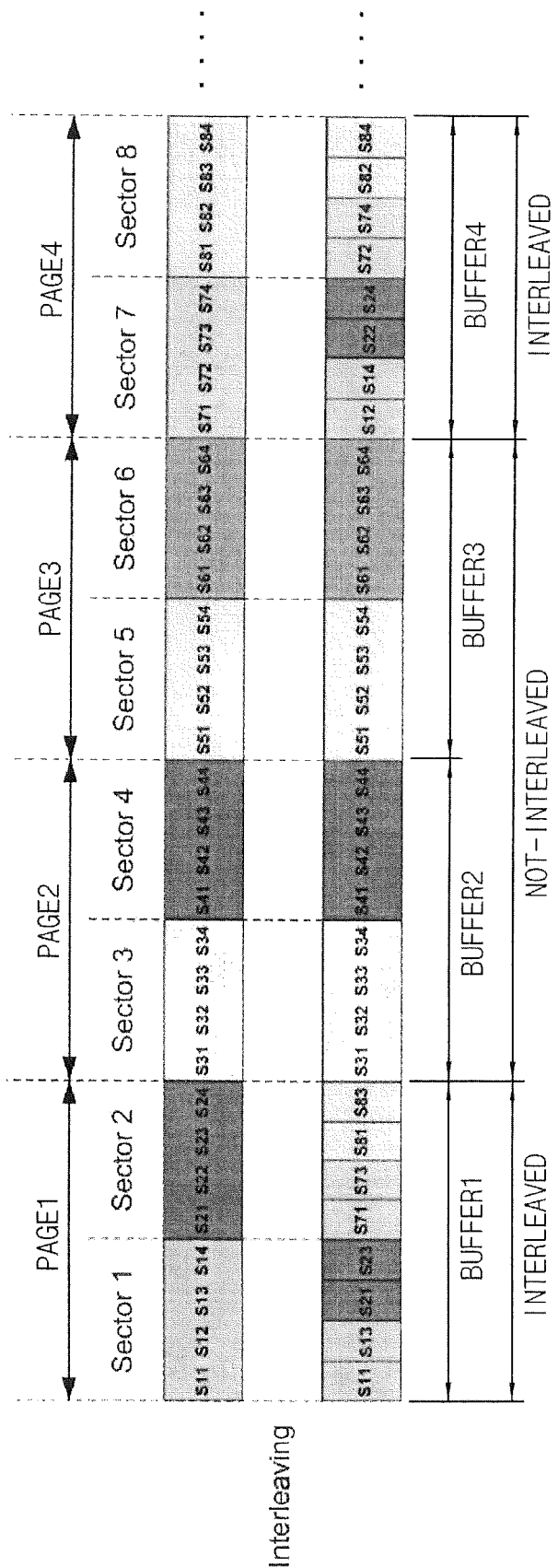
FIG. 7 is a diagram illustrating a third example that interleaving operations are performed on a NAND flash memory device of a multi level cell (MLC) type by an interleaving apparatus of FIG. 1.

FIG. 7 is a diagram illustrating a third example that interleaving operations are performed on a NAND flash memory device of a multi level cell (MLC) type by an interleaving apparatus of FIG. 1.

Referring to FIG. 7, the interleaving apparatus 100 may include four output buffers BUFFER1 through BUFFER4 in the second buffer unit 160 (n=4). Each of four output buffers BUFFER1 through BUFFER4 may have a size corresponding to two sectors. In FIG. 7, four pages PAGE 1' through PAGE4 may be divided into two data groups. Here, an interleaving depth may be 2 (i.e., not 4) because interleaving operations are not performed for one of two data groups on one of two buffer groups (e.g., for a second data group including a second page PAGE2' and a third page PAGE3 on a second buffer group including a second output buffer BUFFER2 and a third output buffer BUFFER3). That is, interleaving operations are performed for only a first data group including a first page PAGE1' and a fourth page PAGE4 on a first buffer group including a first output buffer BUFFER1 and a fourth output buffer BUFFER4.

As several bits (e.g., 4 bits) data are stored in one memory cell of the NAND flash memory device of the MLC type, one word-line may correspond to four pages PAGE 1' through PAGE4. As shown in FIG. 7, for example, a first page PAGE1' may include two sectors SECTOR1 and SECTOR2, a second page PAGE2' may include two sectors SECTOR3 and SECTOR4, a third page PAGE3 may include two sectors SECTOR5 and SECTOR6, and a fourth page PAGE4 may include two sectors SECTOR7 and SECTOR8. As described above, interleaving operations are not performed for all four pages PAGE1' through PAGE4 on all four output buffers BUFFER1 through BUFFER4. That is, interleaving operations are performed for the first page PAGE1' and the fourth page PAGE4 (i.e., the first data group) on the first output buffer BUFFER1 and the fourth output buffer BUFFER4 (i.e., the first buffer group), and interleaving operations are not performed for the second page PAGE2' and the third page PAGE3 (i.e., the second data group) on the second output buffer BUFFER2 and the third output buffer BUFFER3 (i.e., the second buffer group).

In detail, a first sub sector S11 of a first sector SECTOR1 is stored into the first output buffer BUFFER1, a second sub sector S12 of the first sector SECTOR1 is stored into the fourth output buffer BUFFER4, a third sub sector S13 of the first sector SECTOR1 is stored into the first output buffer BUFFER1, and a fourth sub sector S14 of the first sector SECTOR1 is stored into the fourth output buffer BUFFER4. In addition, a first sub sector S21 of a second sector SECTOR2 is stored into the first output buffer BUFFER1, a second sub sector S22 of the second sector SECTOR2 is stored into the fourth output buffer BUFFER4, a third sub sector S23 of the second sector SECTOR2 is stored into the first output buffer BUFFER1, and a fourth sub sector S24 of the second sector SECTOR2 is stored into the fourth output buffer BUFFER4.

Then, third and fourth sectors SECTOR3 and SECTOR4 are sequentially stored into the second output buffer BUFFER2, and a fifth and sixth sectors SECTOR5 and SECTOR6 are sequentially stored into the third output buffer BUFFER3. That is, interleaving operations are not performed for the second page PAGE2' (i.e., the third sector SECTOR3 and the fourth sector SECTOR4) and the third page PAGE3 (i.e., the fifth sector SECTOR5 and the sixth sector SECTOR6). And then, interleaving operations are performed for a seventh sector SECTOR7 and an eighth sector SECTOR8 on the first output buffer BUFFER1 and the fourth output buffer BUFFER4. As a result, first interleaving data S11, S13, S21, S23, S71, S73, S81, and S83 may be stored into the first output buffer BUFFER1, second page data S31, S32, S33, S34, S41, S42, S43, and S44 may be stored into the second output buffer BUFFER2, third page data S51, S52, S53, S54, S61, S62, S63, S64 may be stored into the third output buffer BUFFER3, and fourth interleaving data S12, S14, S22, S24, S72, S74, S82, and S84 may be stored into the fourth output buffer BUFFER4.

Figure 8:
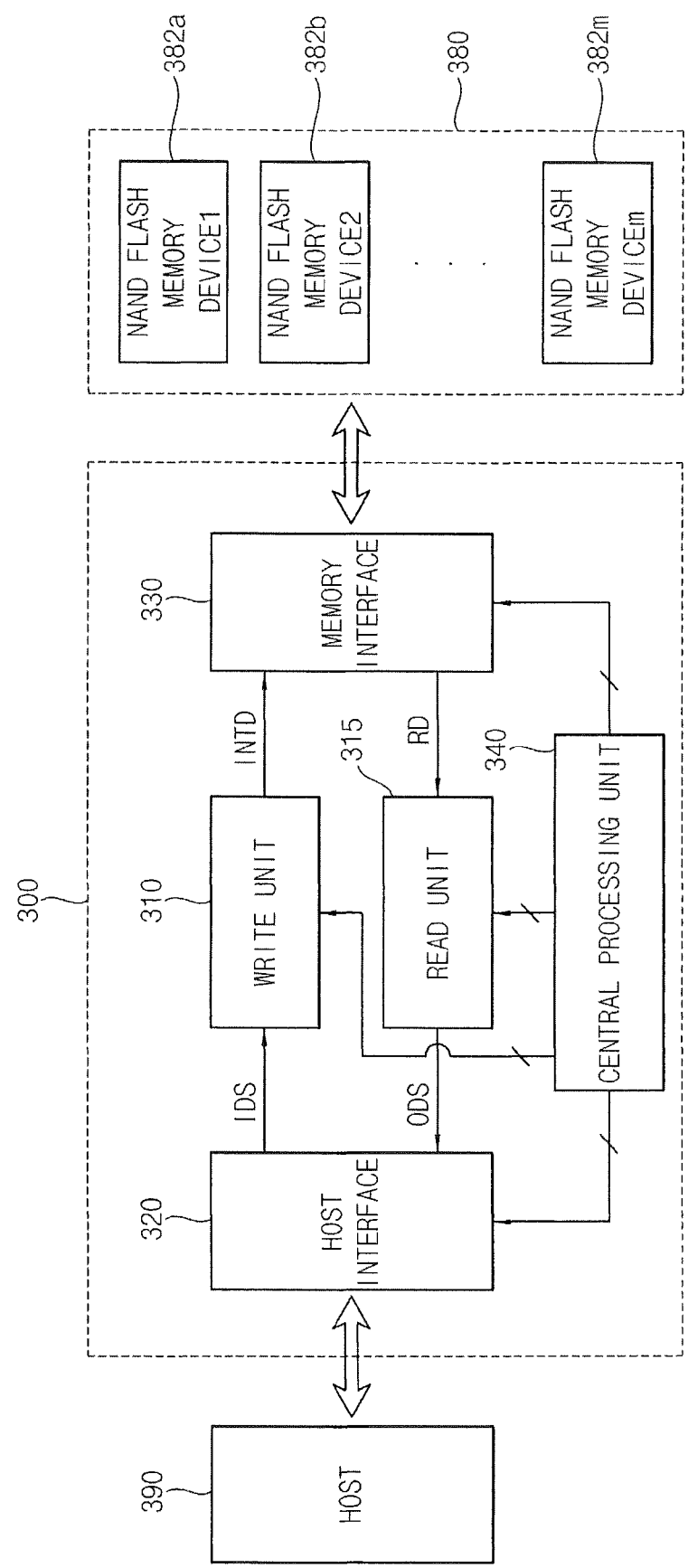
FIG. 8 is a block diagram illustrating a memory controller having an interleaving apparatus of FIG. 1.

FIG. 8 is a block diagram illustrating a memory controller having an interleaving apparatus of FIG. 1.

Referring to FIG. 8, the memory controller 300 may include a write unit 310 and a read unit 315. The write unit 310 may correspond to the interleaving apparatus 100 of FIG. 1. In some example embodiments, the memory controller 300 may further include a host interface 320, a memory interface 330, and a central processing unit 340.

The write unit 310 may generate interleaving data INTD based on sector unit data, and may write the interleaving data INTD into at least one NAND flash memory device 380 in response to write commands and write addresses. The input data IDS may be received from the host device 390, and the sector unit data may be generated by buffering the input data IDS in a sector unit. The read unit 315 may receive read data RD from the at least one NAND flash memory device 380 in response to read commands and read addresses, may generate output data ODS based on the read data RD, and may output the output data ODS to the host device 390. The host interface 320 may interface the input data IDS and the output data ODS with the host device 390. In other words, the host interface 320 is configured to generate the input data IDS from communications with the host device 320 and receive the output data ODS from the read unit 315. The host interface 320 is configured to forward the output data ODS to the host device 390. The memory interface 330 may interface the interleaving data INTD and the read data RD with the at least one NAND flash memory device 380. In other words, the memory interface 330 is configured to output the interleaving data INTD to the at least one NAND flash memory device 380 and receive the read data RD from the at least one NAND flash memory device 380. The central processing unit 340 may control the write unit 310 and the read unit 315 by generating a plurality of control signals for controlling the write unit 310 and the read unit 315. In some example embodiments, the memory controller 300 may be built-in the host device 390 or the at least one NAND flash memory device 380.

Typically, the at least one NAND flash memory device 380 cannot randomly access memory cells in a memory cell array. That is, the at least one NAND flash memory device 380 may perform write operations and read operations in a page unit, and may perform erase operations in a block unit. Thus, in the at least one NAND flash memory device 380, errors may be caused when write operations and read operations are performed in a page unit. In order to correct the errors caused during write operations and read operations, the at least one NAND flash memory device 380 may use error correction codes. Here, amounts that the error correction codes (e.g., parity codes) need to dispose may be increased as sizes of page buffers in the at least on NAND flash memory device 380 are increased. However, a correction ability of the error correction codes for one sector is limited, so that the at least one NAND flash memory device 380 may inaccurately perform error correction operations. In order to solve these problems, the memory controller 300 having the write unit 310 and the read unit 315 may disperse errors of sectors in pages by simultaneously performing interleaving operations and ECC operations (e.g., ECC encoding operations and ECC decoding operations).

Figure 9:
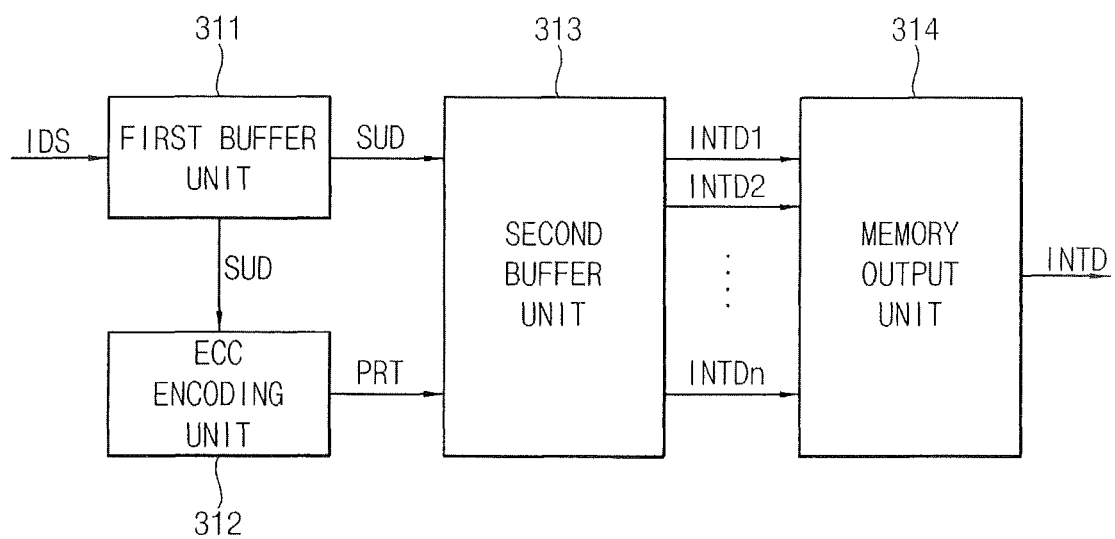
FIG. 9 is a block diagram illustrating a write unit in a memory controller of FIG. 8.

FIG. 9 is a block diagram illustrating a write unit in a memory controller of FIG. 8.

Referring to FIG. 9, the write unit 310 may include a first buffer unit 311, an encoding unit 312, a second buffer unit 313, and a memory output unit 314.

The first buffer unit 311 may buffer the input data IDS in a sector unit to sequentially generate the sector unit data SUD. The encoding unit 312 may perform error check and correction (ECC) operations for the sector unit data SUD, and may sequentially generate the parity codes PRT matching with the sector unit data SUD. The second buffer unit 313 may perform interleaving operations for the sector unit data SUD and the parity codes PRT on a plurality of output buffers. The memory output unit 314 may output interleaving data INTD stored in the output buffers to the at least one NAND flash memory device 380 via the memory interface 330. As described above, the write unit 310 may correspond to the interleaving apparatus 100 of FIG. 1. Thus, the write unit 310 may perform different interleaving operations for each of data groups (i.e., groups of the sector unit data SUD and the parity codes PRT), and may selectively perform interleaving operations for data groups (i.e., groups of the sector unit data SUD and the parity codes PRT). The second buffer unit 313 may correspond to the second buffer unit 160.

Figure 10:
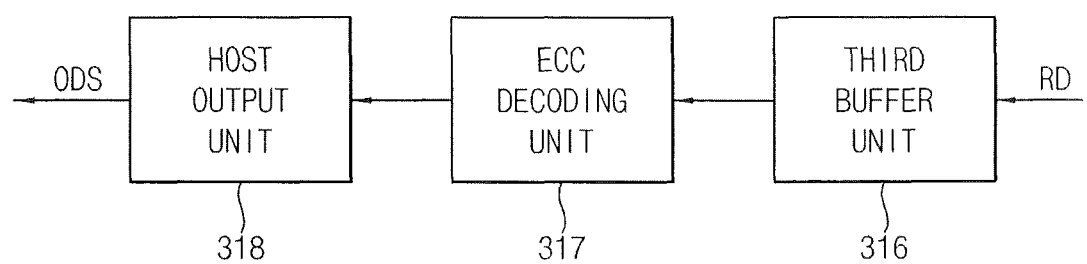
FIG. 10 is a block diagram illustrating a read unit in a memory controller of FIG. 8.

FIG. 10 is a block diagram illustrating a read unit in a memory controller of FIG. 8.

Referring to FIG. 10, the read unit 315 may include a third buffer unit 316, a decoding unit 317, and a host output unit 318.

The third buffer unit 316 may temporarily store the read data RD to sequentially output the read data RD to the decoding unit 317 when the read data RD is input from a memory cell array of the at least one NAND flash memory device 380 to the memory controller 300 in response to read commands. The decoding unit 317 may perform ECC decoding operations for the read data RD output from the third buffer unit 316, and may detect and correct errors of the read data RD. In one example embodiment, the decoding unit 317 may be implemented based on a block code method. In this case, the decoding unit 317 may include a syndrome computation (SC) block, a key equation solver (KES) block, a chien searching (CS) block, and an error evaluator (EE) block. In detail, the SC block may compute syndromes to detect errors of the read data RD. The KES block may calculate coefficients of an error position equation. The CS block may solve the error position equation based on the coefficients of the error position equation. The EE block may indicate error positions based on roots of the error position equation. Then, the decoding unit 317 may correct errors of the read data RD based on the error positions, and may output the read data RD to the host output unit 318.

In another example embodiment, the decoding unit 317 may be implemented based on a viterbi method. In this case, the decoding unit 317 may include a branch metrics calculation (BMC) block, an add compare select (ACS) block, a state metrics memory (SMM) block, and a survivor path memory (SPM) block. In detail, the BMC block may calculate branch metrics to detect errors of the read data RD. The ACS block may add previous state metrics to the branch metrics to calculate new state metrics. The SMM block may store the new state metrics calculated by the ACS block. The SPM block may correct errors of the read data RD based on the new state metrics, and may output the read data RD to the host output unit 318. Further, the decoding unit 317 may be implemented based on a concatenated code method. The host output unit 318 may generate the output data ODS based on the read data RD, and may output the output data ODS to the host device 390 via the host interface 320.

Figure 11:
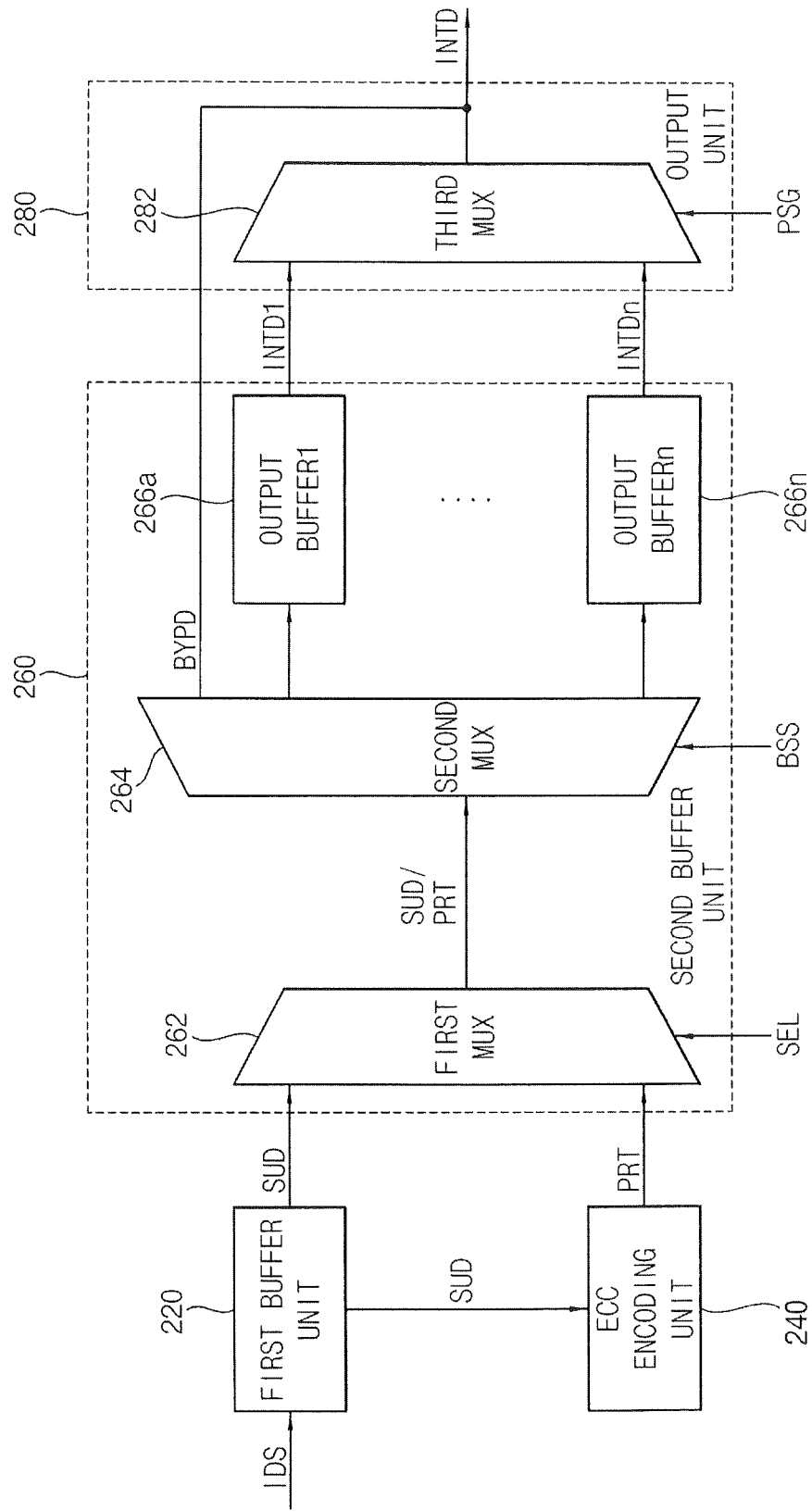
FIG. 11 is a block diagram illustrating an interleaving apparatus according to some example embodiments.

FIG. 11 is a block diagram illustrating an interleaving apparatus according to some example embodiments.

Referring to FIG. 11, the interleaving apparatus 200 may include a first buffer unit 220, an encoding unit 240, a second buffer unit 260, and an output unit 280.

When input data IDS is received from outside, the first buffer unit 220 may buffer the input data IDS in a sector unit to sequentially generate sector unit data SUD, and may sequentially output the sector unit data SUD to the encoding unit 240 and the second buffer unit 260. The input data IDS (i.e., sequence-type data) may be input from a host device to the interleaving apparatus 200 via a host interface. For example, the host device may be a personal computer, and the host interface may include a standard protocol such as an universal serial bus (USB), a multimedia card (MMC), a peripheral component interconnection (PCI), a peripheral component interconnection express (PCI-EXPRESS), an advanced technology attachment (ATA), a serial advanced technology attachment (SATA), a parallel advanced technology attachment (PATA), a small computer system interface (SCSI), a enhanced small disk interface (ESDI), a serial attached small computer system interface (SAS), a integrated drive electronics (IDE), etc. If the host interface includes the SAS, data transference may be relatively fast. In addition, a SAS wide link that performs connections among devices using a plurality of buses may be used. In one example embodiment, the first buffer unit 200 may include an input buffer having a sector size (i.e., a size corresponding to one sector). The input buffer may be implemented by a static random access memory (SRAM) device, or a dynamic random access memory (DRAM) device.

The encoding unit 240 may perform error check and correction (ECC) operations for the sector unit data SUD that is sequentially output from the first buffer unit 220, and sequentially generate parity codes PRT. The parity codes PRT that are sequentially generated by the encoding unit 240 may match with the sector unit data SUD that are sequentially output from the first buffer unit 220, respectively. For example, Hamming code or Bose Chaudhuri Hocquenghem (BCH) code may be used as an ECC encoding algorithm for the encoding unit 240. According to the hamming code, an error correction of one bit may be performed for the sector unit data SUD. According to BCH code, an error correction of several bits may be performed for the sector unit data SUD. However, the ECC encoding algorithm for the encoding unit 240 is not limited thereto.

The second buffer unit 260 may receive the sector unit data SUD from the first buffer unit 220, and may receive the parity codes PRT from the encoding unit 240. The second buffer unit 260 may store the sector unit data SUD and the parity codes PRT into a plurality of output buffers 266a through 266n by performing interleaving operations for the sector unit data SUD and the parity codes PRT. In one example embodiment, the second buffer unit 260 may include a first multiplexer 262, the output buffers 266a through 266n, and a second multiplexer 264. The first multiplexer 262 may selectively output the sector unit data SUD and the parity codes PRT in response to a data selection signal SEL. The second multiplexer 264 may alternatively select the output buffers 266a through 266n in response to a buffer selection signal BSS to perform interleaving operations for the sector unit data SUD and the parity codes PRT. Here, some output lines of the second multiplexer 264 may bypass the output buffers 266a through 266n to be directly coupled to an output line of the third multiplexer 282 of the output unit 280. That is, interleaving operations may not be performed for some of data groups (i.e., groups of the sector unit data SUD and the parity codes PRT) output from the second multiplexer 264. Thus, bypassing data BYPD may be directly output to page buffers of at least one memory device. The output buffers 266a through 266n may store the sector unit data SUD and the parity codes PRT output from the second multiplexer 264. The data selection signal SEL and the buffer selection signal BSS may be signals provided from a central processing unit (CPU) in a memory controller and the like.

The output buffers 266a through 266n in the second buffer unit 260 may be implemented by a SRAM device, or a DRAM device. Sizes of the output buffers 266a through 266n may be variously determined based on required conditions for interleaving operations. Preferably, sizes of the output buffers 266a through 266n may be between a sector size and a page size (i.e., more than a sector size, and less than a page size). For example, assuming that sizes of the output buffers 266a through 266n are the same as a page size (i.e., a size corresponding to one page), when interleaving data INTD1 through INTDn having a page size are stored in the output buffers 266a through 266n, the interleaving data INTD1 through INTDn may be output from the output buffers 266a through 266n to a memory cell array of at least one memory device via page buffers based on write commands.

The second buffer unit 260 may perform interleaving operations in various manners. In one example embodiment, the second buffer unit 260 may perform different interleaving operations for each of data groups (i.e., groups of the sector unit data SUD and the parity codes PRT). For example, the second buffer unit 260 may perform different interleaving operations for each of data groups by controlling the data selection signal SEL and the buffer selection signal BSS. In one example embodiment, the second buffer unit 260 may selectively perform interleaving operations for data groups (e.g., groups of the sector unit data SUD and the parity codes PRT). That is, the second buffer unit 260 may perform interleaving operations for selected data groups, and may not perform interleaving operations for non-selected data groups. For example, the second buffer unit 260 may selectively perform interleaving operations for data groups by controlling the data selection signal SEL and the buffer selection signal BSS. Here, an interleaving depth may correspond to the number of the output buffers 266a through 266n.

In detail, the second buffer unit 260 may divide the sector unit data SUD and the parity codes PRT into a plurality of data groups, and may divide the output buffers 266a through 266n into a plurality of buffer groups. In one example embodiment, the second buffer unit 260 may perform interleaving operations for each of data groups, and may store interleaving data into each of buffer groups. For example, the second buffer unit 260 may divide the sector unit data SUD and the parity codes PRT into two data groups (i.e., a first data group and a second data group), and may divide the output buffers 266a through 266n into two buffer groups (i.e., a first buffer group and a second buffer group). Then, the second buffer unit 260 may perform interleaving operations for the first data group to store interleaving data of the first data group into the first buffer group, and may perform interleaving operations for the second data group to store interleaving data of the second data group into the second buffer group. In one example embodiment, the second buffer unit 260 may perform bypassing operations for some of data groups to directly output bypassing data BYPD to at least one memory device. For example, the second buffer unit 260 may divide the sector unit data SUD and the parity codes PRT into two data groups (i.e., a first data group and a second data group), may perform interleaving operations for the first data group to store interleaving data of the first data group into the output buffers 266a through 266n, and may perform bypassing operations for the second data group to directly output bypassing data BYPD to page buffers of at least one memory device.

The output unit 280 may output interleaving data INTD1 through INTDn from the output buffers 266a through 266n to a memory cell array of at least one memory device via page buffers. In one example embodiment, the output unit 280 may include a third multiplexer 282. The third multiplexer 282 selects the output buffers 266a through 266n in response to a write selection signal PSG; so that interleaving data INTD1 through INTDn stored in the output buffers 266a through 266n may be output to a memory cell array of at least one memory device via page buffers. At least one memory device may be a NAND flash memory device of a signal level cell (SLC) type, or a NAND flash memory device of a multi level cell (MLC) type. In addition, at least one memory device may be coupled to the interleaving apparatus 200 in a single channel manner, or in a multi channel manner.

As described above, the interleaving apparatus 200 may include the first buffer unit 220, the encoding unit 240, the second buffer unit 260, and the output unit 280. As a result, the interleaving apparatus 200 may perform different interleaving operations for each of data groups, and may selectively perform bypassing operations for data groups. In addition, since the interleaving apparatus 200 includes the input buffer having a sector size in the first buffer unit 220 and the output buffers 266a through 266n having a size between a sector size and a page size in the second buffer unit 260, the interleaving apparatus 200 may be implemented in a small size (i.e., sizes of buffers and the number of buffers may be reduced). Thus, the interleaving apparatus 200 may have a simple structure, and may efficiently perform interleaving operations in various manners.

Figure 12:
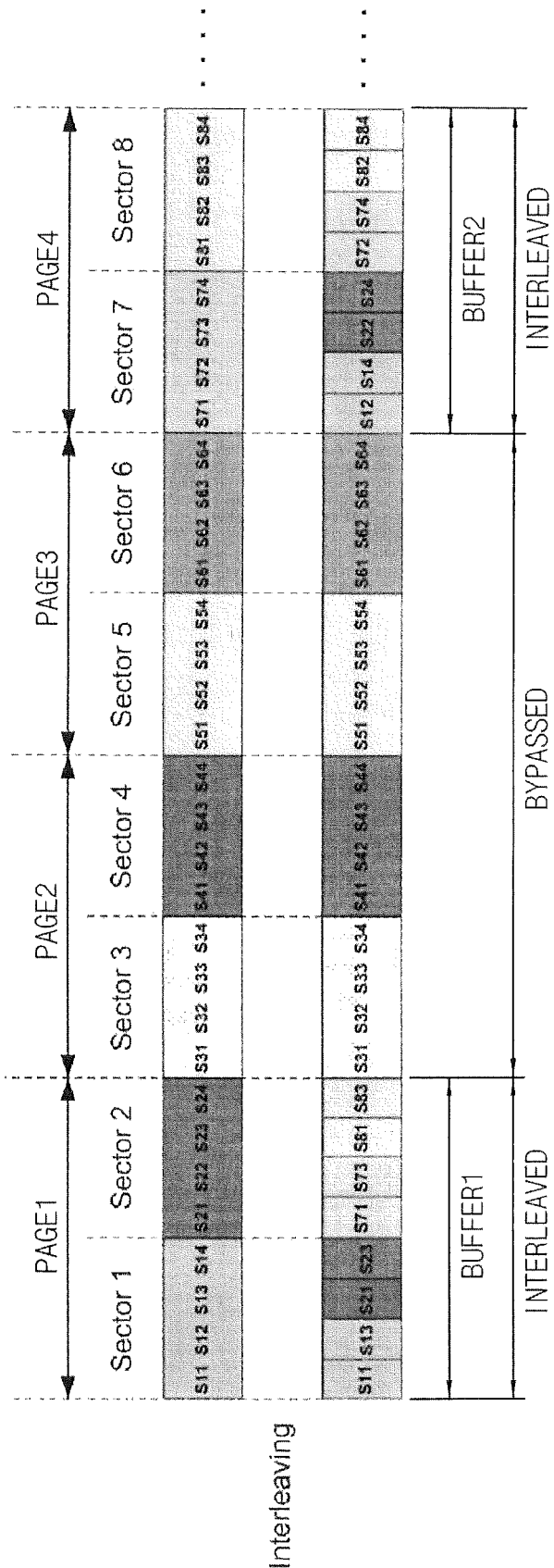
FIG. 12 is a diagram illustrating an example that interleaving operations are performed on a NAND flash memory device of a multi level cell (MLC) type by an interleaving apparatus of FIG. 11.

FIG. 12 is a diagram illustrating an example that interleaving operations are performed on a NAND flash memory device of a multi level cell (MLC) type by an interleaving apparatus of FIG. 11.

Referring to FIG. 12, the interleaving apparatus 200 may include two output buffers BUFFER1 and BUFFER2 in the second buffer unit 260 (n=2). Each of two output buffers BUFFER1 and BUFFER2 may have a size corresponding to two sectors. In FIG. 12, four pages PAGE1' through PAGE4 may be divided into two data groups. Here, an interleaving depth may be 2 (i.e., not 4) because interleaving operations are not performed for one of two data groups (e.g., for a second data group including a second page PAGE2' and a third page PAGE3). That is, bypassing operations are performed for one of two data groups (e.g., for the second data group including the second page PAGE2' and the third page PAGE3).

As several bits (e.g., 4 bits) data is stored in one memory cell of the NAND flash memory device of the MLC type, one word-line may correspond to four pages PAGE1' through PAGE4. As shown in FIG. 12, for example, a first page PAGE1' may include two sectors SECTOR1 and SECTOR2, a second page PAGE2' may include two sectors SECTOR3 and SECTOR4, a third page PAGE3 may include two sectors SECTOR5 and SECTOR6, and a fourth page PAGE4 may include two sectors SECTOR7 and SECTOR8. As described above, interleaving operations are not performed for all four pages PAGE1' through PAGE4 on all two output buffers BUFFER1 and BUFFER2. That is, interleaving operations are performed for the first page PAGE1' and the fourth page PAGE4 (i.e., the first data group) on the first output buffer BUFFER1 and the second output buffer BUFFER2, and bypassing operations are performed for the second page PAGE2' and the third page PAGE3 (i.e., the second data group).

In detail, a first sub sector S11 of a first sector SECTOR1 is stored into the first output buffer BUFFER1, a second sub sector S12 of the first sector SECTOR1 is stored into the second output buffer BUFFER2, a third sub sector S13 of the first sector SECTOR1 is stored into the first output buffer BUFFER1, and a fourth sub sector S14 of the first sector SECTOR1 is stored into the second output buffer BUFFER2. In addition, a first sub sector S21 of a second sector SECTOR2 is stored into the first output buffer BUFFER1, a second sub sector S22 of the second sector SECTOR2 is stored into the second output buffer BUFFER2, a third sub sector S23 of the second sector SECTOR2 is stored into the first output buffer BUFFER1, and a fourth sub sector S24 of the second sector SECTOR2 is stored into the second output buffer BUFFER2.

Then, bypassing operations are performed for a third sector SECTOR3 and a fourth sector SECTOR4 (i.e., the second page PAGE2'), so that the second page PAGE2' may be directly stored in page buffers of the NAND flash memory device. In addition, bypassing operations are performed for a fifth sector SECTOR5 and a sixth sector SECTOR6 (i.e., the third page PAGE3), so that the third page PAGE3 may be directly stored in page buffers of the NAND flash memory device. That is, interleaving operations are not performed for the second page PAGE2' (i.e., the third sector SECTOR3 and the fourth sector SECTOR4) and the third page PAGE3 (i.e., the fifth sector SECTOR5 and the sixth sector SECTOR6). Then, interleaving operations are performed for a seventh sector SECTOR7 and an eighth sector SECTOR8 on the first output buffer BUFFER1 and the second output buffer BUFFER2.

As a result, first interleaving data S11, S13, S21, S23, S71, S73, S81, and S83 may be stored into the first output buffer BUFFER1, and second interleaving data S12, S14, S22, S24, S72, S74, S82, and S84 may be stored into the second output buffer BUFFER2. In addition, second bypassing data S31, S32, S33, S34, S41, S42, S43, and S44 and third bypassing data S51, S52, S53, S54, S61, S62, S63, and S64 may be directly stored into page buffers of the NAND flash memory device. Thus, the first interleaving data S11, S13, S21, S23, S71, S73, S81, and S83 and the second interleaving data S12, S14, S22, S24, S72, S74, S82, and S84 may be written into a memory cell array of the NAND flash memory device via page buffers in response to write commands. In addition, the second bypassing data S31, S32, S33, S34, S41, S42, S43, and S44 and the third bypassing data S51, S52, S53, S54, S61, S62, S63, and S64 may be directly written into the memory cell array of the NAND flash memory device in response to write commands.

Figure 13:
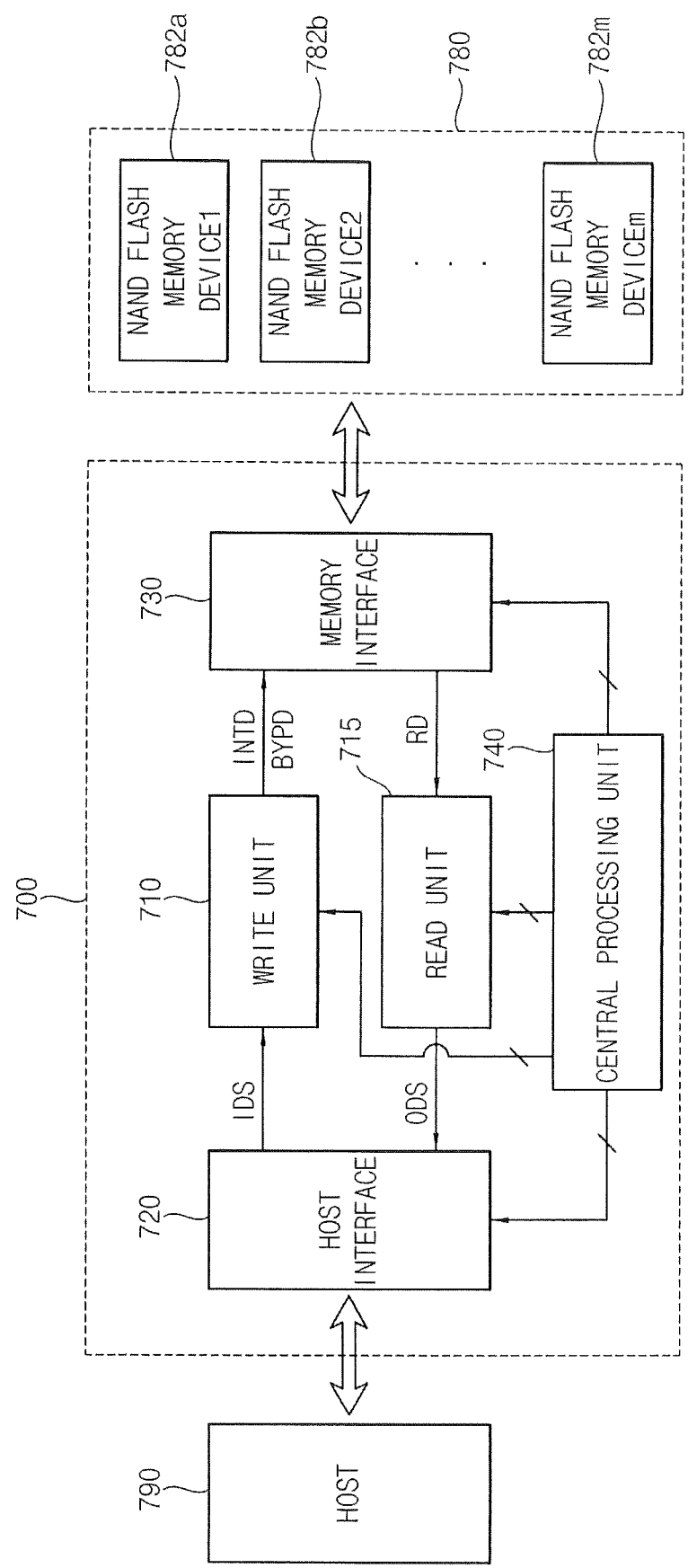
FIG. 13 is a block diagram illustrating a memory controller having an interleaving apparatus of FIG. 11.

FIG. 13 is a block diagram illustrating a memory controller having an interleaving apparatus of FIG. 11.

Referring to FIG. 13, the memory controller 700 may include a write unit 710 and a read unit 715. The write unit 710 may correspond to the interleaving apparatus 200 of FIG. 11. In some example embodiments, the memory controller 700 may further include a host interface 720, a memory interface 730, and a central processing unit 740.

The write unit 710 may generate interleaving data INTD and bypassing data BYPD based on sector unit data, and may write the interleaving data INTD and the bypassing data BYPD into the at least one NAND flash memory device 780 in response to write commands and write addresses. Input data IDS may be received from the host device 790, and the sector unit data may be generated by buffering the input data IDS in a sector unit. The read unit 715 may receive read data RD from the at least one NAND flash memory device 780 in response to read commands and read addresses, may generate output data ODS based on the read data RD, and may output the output data ODS to the host device 790. The host interface 720 may interface the input data IDS and the output data ODS with the host device 790. In other words, the host interface 720 is configured to generate the input data IDS from communications with the host device 720 and receive the output data ODS from the read unit 715. The host interface 720 is configured to forward the output data ODS to the host device 790. The memory interface 730 may interface the interleaving data INTD and the read data RD with the at least one NAND flash memory device 780. In other words, the memory interface 730 is configured to output the interleaving data INTD to the at least one NAND flash memory device 780 and receive the read data RD from the at least one NAND flash memory device 780. The central processing unit 740 may control the write unit 710 and the read unit 715 by generating a plurality of control signals for controlling the write unit 710 and the read unit 715. In some example embodiments, the memory controller 700 may be built-in the host device 790 or the at least one NAND flash memory device 780.

Figure 14:
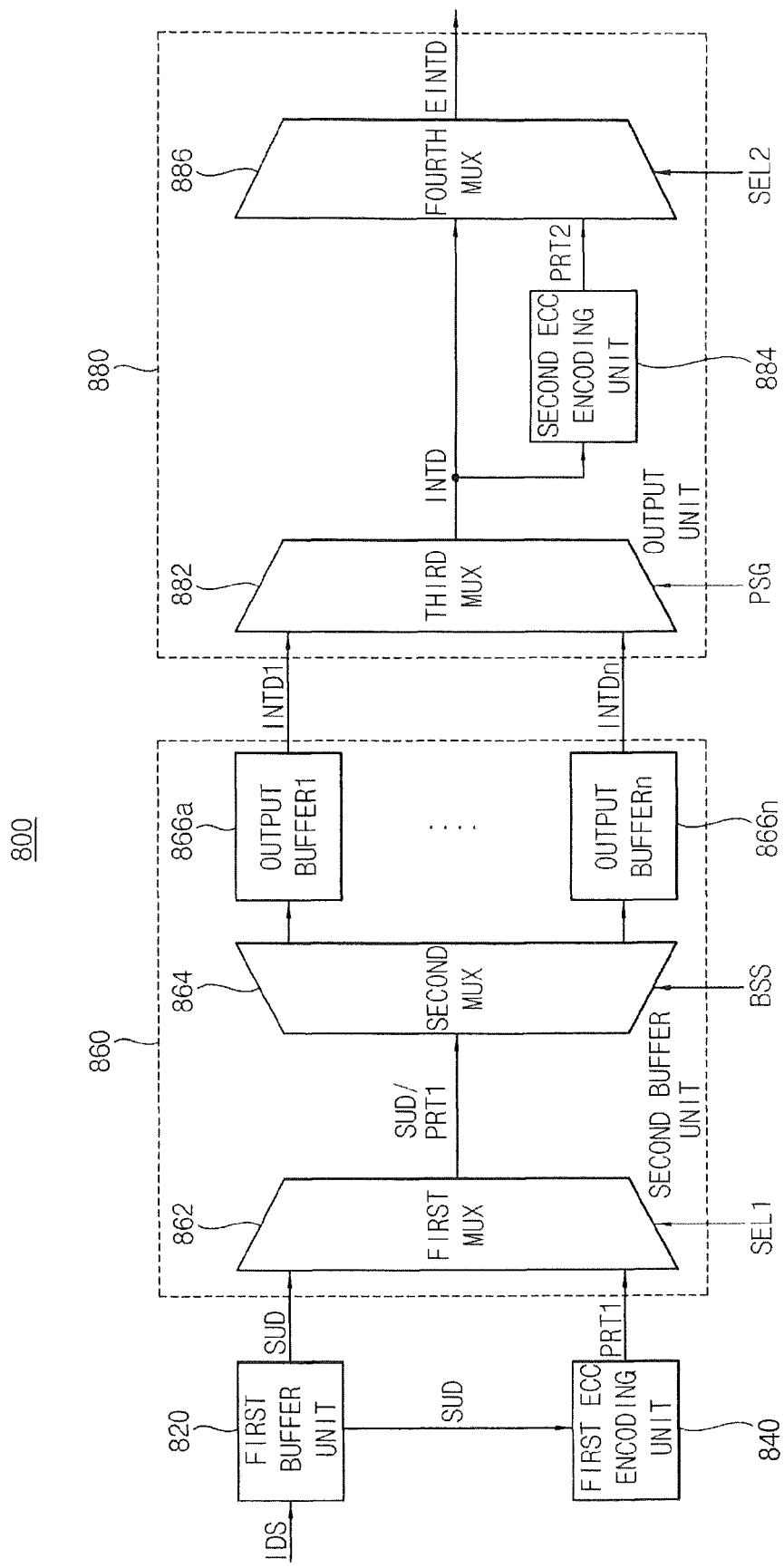
FIG. 14 is a block diagram illustrating an interleaving apparatus according to some example embodiments.

FIG. 14 is a block diagram illustrating an interleaving apparatus according to some example embodiments.

Referring to FIG. 14, the interleaving apparatus 800 may include a first buffer unit 820, a first encoding unit 840, a second buffer unit 860, and an output unit 880. The first buffer 820, first encoding unit 840 and second buffer unit 820 may be the same as the first buffer unit 220, the first encoding unit 240 and the second buffer unit, respectively. Since the first buffer unit 220, the first encoding unit 240, and the second buffer unit 260 are described above, descriptions of the first buffer unit 820, the first encoding unit 840, and the second buffer unit 860 will be omitted.

The output unit 880 may perform ECC encoding operations for interleaving data INTD1 through INTDn stored in output buffers 866a through 866n of the second buffer unit 860 to output encoded interleaving data EINTD to at least one memory device. In one example embodiment, the output unit 880 may include a third multiplexer 882, a second encoding unit 884, and a fourth multiplexer 886. The third multiplexer 882 may select the output buffers 866a through 866n in response to a write selection signal PGS to output the interleaving data INTD1 through INTDn. The second encoding unit 884 may perform ECC encoding operations for the interleaving data INTD1 through INTDn to generate second parity codes PRT2. The fourth multiplexer 886 may output the encoded interleaving data EINTD to at least one memory device in response to a second data selection signal SEL2. Here, the encoded interleaving data EINTD may be output based on the interleaving data INTD and the second parity codes PRT2. At least one memory device may be a NAND flash memory device of a signal level cell (SLC) type, or a NAND flash memory device of a multi level cell (MLC) type. In addition, at least one memory device may be coupled to the interleaving apparatus 800 in a single channel manner, or in a multi channel manner.

As described above, the interleaving apparatus 800 may prevent errors caused when write operations and read operations are performed in a NAND flash memory device. That is, the first buffer unit 820 may generate sector unit data SUD by buffering input data IDS in a sector unit, the first encoding unit 840 may generate first parity codes PRT1 by performing ECC encoding operations for the sector unit data SUD, and the second buffer unit 860 may generate the interleaving data INTD1 through INTDn by performing interleaving operations for the sector unit data SUD and the first parity codes PRT1. Further, the interleaving apparatus 800 may efficiently disperse errors of sectors in pages by performing ECC encoding operations for the interleaving data INTD. That is, the encoded interleaving data EINTD may be written into a memory cell array of the NAND flash memory device. The encoded interleaving data EINTD may be generated by sequentially performing ECC encoding operations for the input data IDS at the first encoding unit 840 and ECC encoding operations for the interleaving data INTD at the second encoding unit 884. Although it is illustrated that the output unit 880 performs ECC encoding operations for all interleaving data INTD1 through INTDn in FIG. 14, it is not limited thereto. For example, the output unit 880 may perform ECC encoding operations for some of the interleaving data INTD1 through INTDn.

Figure 15:
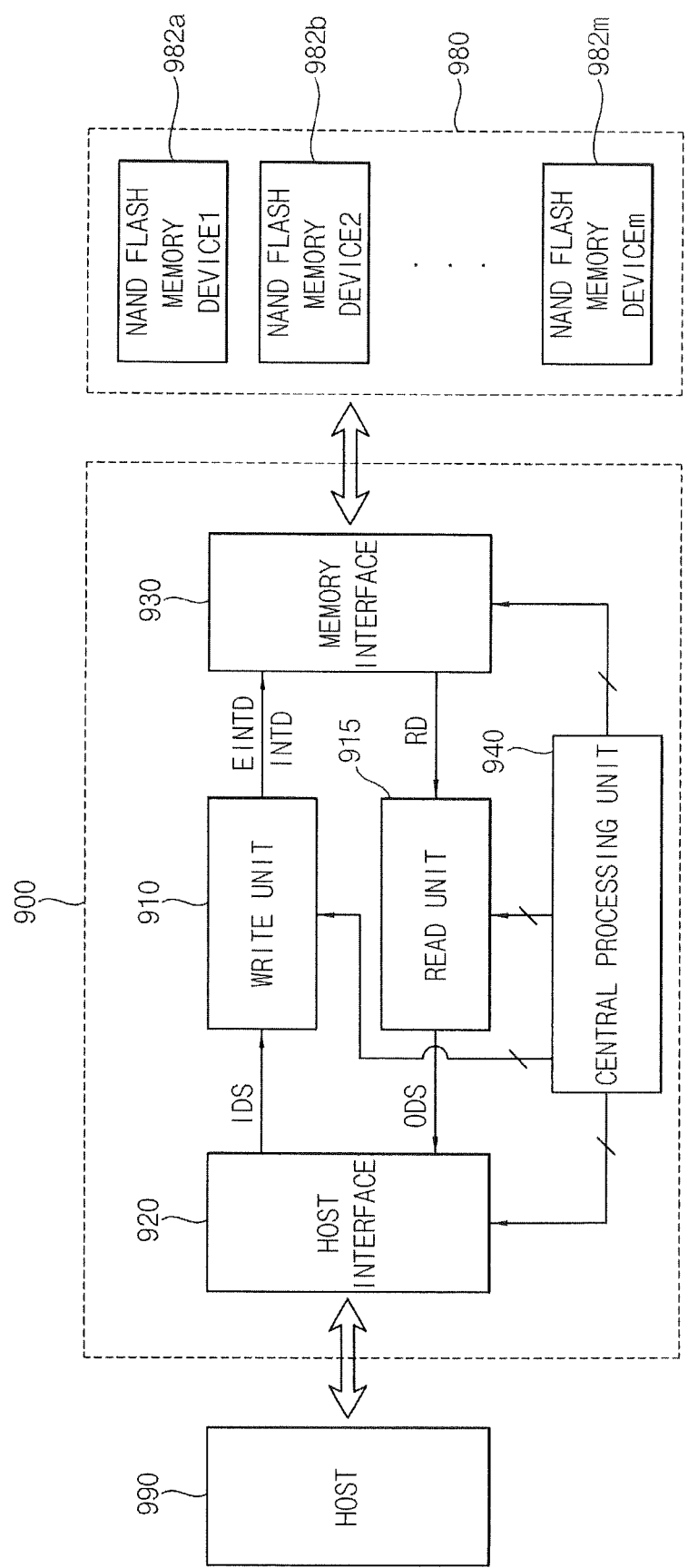
FIG. 15 is a block diagram illustrating a memory controller having an interleaving apparatus of FIG. 14.

FIG. 15 is a block diagram illustrating a memory controller having an interleaving apparatus of FIG. 14.

Referring to FIG. 15, the memory controller 900 may include a write unit 910 and a read unit 915. The write unit 910 may correspond to the interleaving apparatus 800 of FIG. 14. In some example embodiments, the memory controller 900 may further include a host interface 920, a memory interface 930, and a central processing unit 940.

The write unit 910 may generate interleaving data INTD and/or encoded interleaving data EINTD based on sector unit data, and may write the interleaving data INTD and/or the encoded interleaving data EINTD into at least one NAND flash memory device 980 in response to write commands and write addresses. Input data IDS may be received from the host device 990, and the sector unit data may be generated by buffering the input data IDS in a sector unit. The read unit 915 may receive read data RD from the at least one NAND flash memory device 980 in response to read commands and read addresses, may generate output data ODS based on the read data RD, and may output the output data ODS to the host device 990. The host interface 920 may interface the input data IDS and the output data ODS with the host device 990. In other words, the host interface 920 is configured to generate the input data IDS from communications with the host device 920 and receive the output data ODS from the read unit 915. The host interface 920 is configured to forward the output data ODS to the host device 990. The memory interface 930 may interface the interleaving data INTD, the encoded interleaving data EINTD, and/or the read data RD with the at least one NAND flash memory device 980. In other words, the memory interface 930 is configured to output the interleaving data INTD and the encoded interleaving data EINTD to the at least one NAND flash memory device 980 and receive the read data RD from the at least one NAND flash memory device 980. The central processing unit 940 may control the write unit 910 and the read unit 915 by generating a plurality of control signals for controlling the write unit 910 and the read unit 915. In some example embodiments, the memory controller 900 may be built-in the host device 990 or the at least one NAND flash memory device 980.

Figure 16:
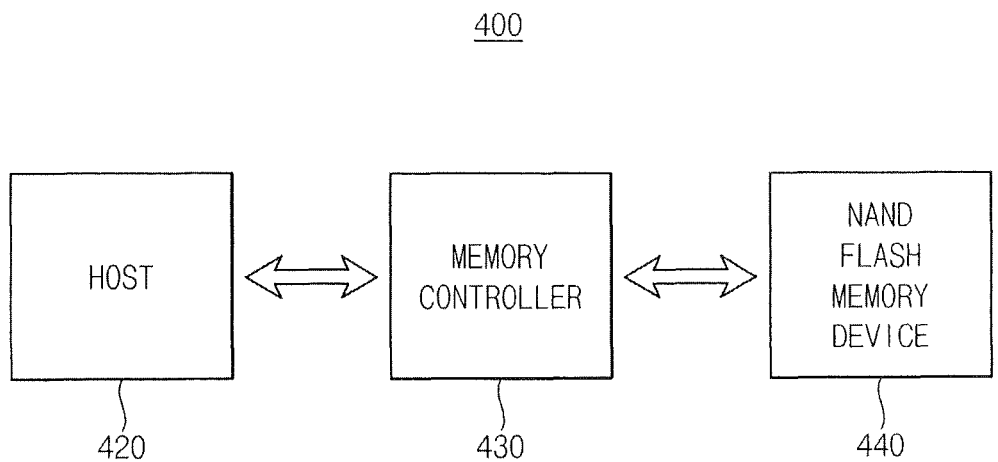
FIG. 16 is a block diagram illustrating a first example of a memory system including a memory controller according to some example embodiments.

FIG. 16 is a block diagram illustrating a first example of a memory system including a memory controller according to some example embodiments.

Referring to FIG. 16, the memory system 400 may include a host device 420, a memory controller 430, and at least one NAND flash memory device 440. The memory controller 430 may correspond to one of the memory controllers 300, 700, and 900.

In the memory system 400, the memory controller 430 may be placed between the host device 420 and the at least one NAND flash memory device 440. In one example embodiment, the at least one NAND flash memory device 440 may be coupled to the memory controller 430 in a single channel manner, or in a multi channel manner. The memory controller 430 may include a write unit, a read unit, a host interface, a memory interface, and a central processing unit because the memory controller 430 is physically separated from the host device 420 and the at least one NAND flash memory device 440. In one example embodiment, the host interface of the memory controller 430 may interact with the host device 420 using a standard protocol such as an universal serial bus (USB), a multimedia card (MMC), a peripheral component interconnection (PCI), a peripheral component interconnection express (PCI-EXPRESS), an advanced technology attachment (ATA), a serial advanced technology attachment (SATA), a parallel advanced technology attachment (PATA), a small computer system interface (SCSI), a enhanced small disk interface (ESDI), a serial attached small computer system interface (SAS), a integrated drive electronics (IDE), etc. In addition, the memory interface of the memory controller 430 may interact with the at least one NAND flash memory device 440 using a NAND interface protocol. The memory system 400 may be widely used because the host interface of the memory controller 430 uses a standard protocol that is already supported by the host device 420, and the memory interface of the memory controller 430 uses a standard protocol that is already supported by the at least one NAND flash memory device 440.

Figure 17:
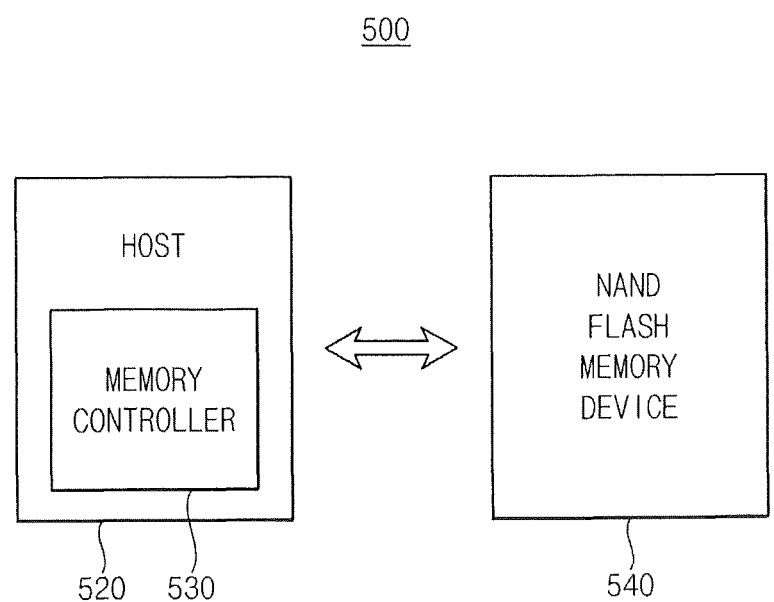
FIG. 17 is a block diagram illustrating a second example of a memory system including a memory controller according to some example embodiments.

FIG. 17 is a block diagram illustrating a second example of a memory system including a memory controller according to some example embodiments.

Referring to FIG. 17, the memory system 500 may include a host device 520 having a memory controller 530 and at least one NAND flash memory device 540. The memory controller 530 may correspond to one of the memory controllers 300, 700, and 900.

In the memory system 500, the memory controller 530 may be built-in the host device 520. In one example embodiment, the at least one NAND flash memory device 540 may be coupled to the memory controller 530 in a single channel manner, or in a multi channel manner. The memory controller 530 may not include a host interface, or may interact with the host device 520 using an inherent protocol because the memory controller 530 is built-in the host device 520. Further, when the memory controller 530 does not include a central processing unit, a host processor of the host device 520 may perform operations of the central processing unit for the memory controller 530. In one example embodiment, the host interface of the memory controller 530 may interact with the host device 520 using an inherent protocol. On the other hand, the memory interface of the memory controller 530 may interact with the at least one NAND flash memory device 540 using a NAND interface protocol. The memory system 500 may operate relatively fast because the memory controller 530 is built-in the host device 520.

Figure 18:
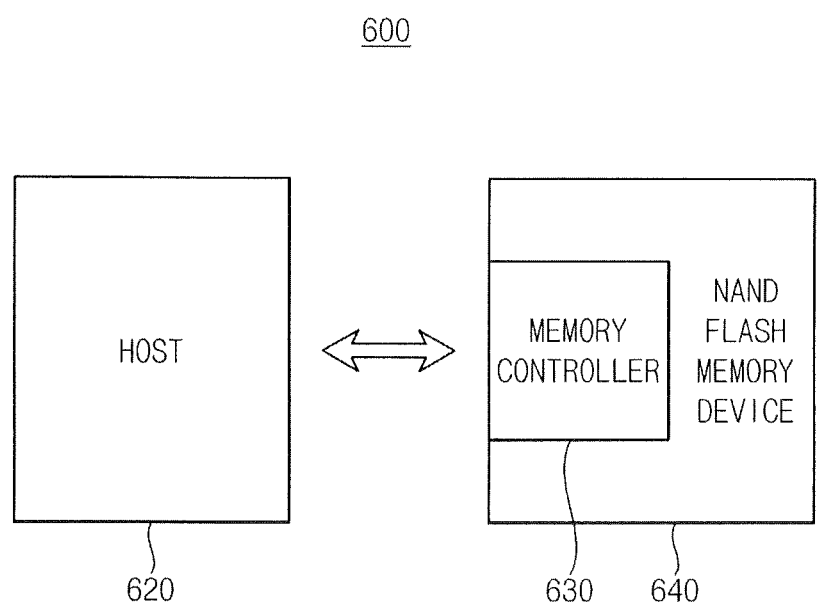
FIG. 18 is a block diagram illustrating a third example of a memory system including a memory controller according to some example embodiments.

FIG. 18 is a block diagram illustrating a third example of a memory system including a memory controller according to some example embodiments.

Referring to FIG. 18, the memory system 600 may include a host device 620 and at least one NAND flash memory device 640 having a memory controller 630. The memory controller 630 may correspond to one of the memory controllers 300, 700, and 900.

In the memory system 600, the memory controller 630 may be built-in the at least one memory device 640. In one example embodiment, the at least one NAND flash memory device 640 may be coupled to the memory controller 630 in a single channel manner, or in a multi channel manner. The memory controller 630 may not include a memory interface, or may interact with the at least one NAND flash memory device 640 using an inherent protocol because the memory controller 630 is built-in the at least one NAND flash memory device 640. Further, a central processing unit of the memory controller 630 may control the at least one NAND flash memory device 640, and a plurality of output buffers in a write unit of the memory controller 630 may function as page buffers of the at least one NAND flash memory device 640. In one example embodiment, the host interface of the memory controller 630 may interact with the host device 620 using a standard protocol such as an universal serial bus (USB), a multimedia card (MMC), a peripheral component interconnection (PCI), a peripheral component interconnection express (PCI-EXPRESS), an advanced technology attachment (ATA), a serial advanced technology attachment (SATA), a parallel advanced technology attachment (PATA), a small computer system interface (SCSI), a enhanced small disk interface (ESDI), a serial attached small computer system interface (SAS), a integrated drive electronics (IDE), etc. In addition, the memory interface of the memory controller 430 may interact with the at least one NAND flash memory device 440 using a NAND interface protocol. On the other hand, the memory interface of the memory controller 630 may interact with the at least one NAND flash memory device 640 using an inherent protocol. The memory system 600 may operate relatively fast because the memory controller 630 is built-in the at least one NAND flash memory device 640. For example, the at least one NAND flash memory device 640 having the memory controller 630 may be referred to One-NAND memory device.

Inventive concepts may be applied to a semiconductor memory device employing interleaving functions. Thus, inventive concepts may be applied to an electric device such as a desktop computer, a laptop computer, a digital camera, a video camcorder, a cellular phone, a smart phone, a portable multimedia player (PMP), a personal digital assistant (PDA), a MP3 player, a digital television, a solid state drive (SSD), a navigation device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An interleaving apparatus, comprising:
    a first buffer unit configured to buffer input data in units having a size of a sector to generate sector unit data;
    an encoding unit configured to encode the sector unit data and generate a plurality of parity codes based on the encoding;
    a second buffer unit configured to interleave the sector unit data and the parity codes and generate interleaving data based on the interleaving, the second buffer unit including a plurality of output buffers configured to store the interleaving data; and
    an output unit configured to output the interleaving data, wherein the second buffer unit is configured to divide the sector unit data and the parity codes into a plurality of data groups, interleave at least one of the plurality of data groups and sequentially store at least another of the plurality of data groups.

2. The interleaving apparatus of claim 1, wherein the first buffer unit includes an input buffer, a size of the input buffer being the sector.

3. The interleaving apparatus of claim 2, wherein sizes of the plurality of output buffers are between the sector and a page.

4. The interleaving apparatus of claim 1, wherein the second buffer unit is configured to divide the sector unit data and the parity codes into a first data group and a second data group, divide the plurality of output buffers into a first buffer group and a second buffer group, interleave the first data group into the first buffer group, and sequentially store the second data group in the second buffer group.

5. The interleaving apparatus of claim 1, wherein the output unit is configured to encode the interleaving data and output encoded interleaving data.

6. A memory controller, comprising:
a write unit configured to receive write commands and write addresses, buffer input data output from a host device in units having a size of a sector to generate sector unit data, interleave the sector unit data, generate interleaving data based on the interleaving, and to write the interleaving data into at least one memory device in response to the write commands and write addresses, the write unit including,
a first buffer unit configured to buffer the input data and generate the sector unit data based on the input data,
an encoding unit configured to encode the sector unit data and generate a plurality of parity codes based on the encoding,
a second buffer unit configured to interleave the sector unit data and the parity codes and generate the interleaving data, the second buffer unit including a plurality of output buffers configured to store the interleaving data, the second buffer unit being configured to divide the sector unit data and the parity codes into a plurality of data groups, interleave at least one of the plurality of data groups and sequentially store at least another of the plurality of data groups; and
a read unit configured to receive read commands and read addresses, read read data from the at least one memory device in response to the read commands and read addresses, generate output data based on the read data, and output the output data to the host device.

7. The memory controller of claim 6, wherein the memory controller further comprises:
a central processing unit configured to control the write unit and the read unit;
a host interface configured to receive the input data from the host device and output the output data to the host device; and
a memory interface configured to output the interleaving data and receive the read data from the at least one memory device.

8. The memory controller of claim 6, wherein the write unit comprises:
a memory output unit configured to output the interleaving data to the at least one memory device.

9. The memory controller of claim 8, wherein the memory output unit is configured to encode the interleaving data and output the encoded interleaving data to the at least one memory device.

10. The memory controller of claim 8, wherein the read unit comprises:
a third buffer unit configured to store the read data;
a decoding unit configured to decode the read data and generate the output data based on the decoding; and
a host output unit configured to output the output data to the host device.

11. A system comprising:
a memory controller including,
a write unit configured to receive write commands and write addresses, buffer input data output from a host device in units having a size of a sector to generate sector unit data, interleave the sector unit data, generate interleaving data based on the interleaving, and to write the interleaving data into at least one memory device in response to the write commands and write addresses, the write unit including,
a first buffer unit configured to buffer the input data and generate the sector unit data based on the input data,
an encoding unit configured to encode the sector unit data and generate a plurality of parity codes based on the encoding,
a second buffer unit configured to interleave the sector unit data and the parity codes and generate the interleaving data, the second buffer unit including a plurality of output buffers configured to store the interleaving data, the second buffer unit being configured to divide the sector unit data and the parity codes into a plurality of data groups, interleave at least one of the plurality of data groups and sequentially store at least another of the plurality of data groups, and
a read unit configured to receive read commands and read addresses, read read data from the at least one memory device in response to the read commands and read addresses, generate output data based on the read data, and output the output data to the host device;
the host device configured to output the input data and receive the output data; and
the at least one memory device configured to receive the interleaving data.

12. The system of claim 11, wherein the memory controller is in one of the host device and the at least one memory device.

* * * * *